US007025846B2

(12) United States Patent
Caretta

(10) Patent No.: US 7,025,846 B2

(45) Date of Patent: Apr. 11, 2006

(54) SELF-SUPPORTING TYRE FOR VEHICLE WHEELS AND METHOD FOR MANUFACTURING THE SAME

(75) Inventor: Renato Caretta, Gallarate (Varese) (IT)

(73) Assignee: Pirelli Pneumatici S.p.A., Milan (IT)

( * ) Notice: Subject to any disclaimer, the term of this patent is extended or adjusted under 35 U.S.C. 154(b) by 140 days.

(21) Appl. No.: 10/451,390

(22) PCT Filed: Dec. 3, 2001

(86) PCT No.: PCT/EP01/14100

§ 371 (c)(1),
(2), (4) Date: Jun. 23, 2003

(87) PCT Pub. No.: WO01/36185

PCT Pub. Date: May 25, 2001

(65) Prior Publication Data

US 2004/0074580 A1 Apr. 22, 2004

Related U.S. Application Data

(60) Provisional application No. 60/265,616, filed on Feb. 2, 2001.

(30) Foreign Application Priority Data

Dec. 22, 2000 (EP) ................................ 00830845

(51) Int. Cl.
*B60C 17/00* (2006.01)
*B60C 17/04* (2006.01)
*B29D 30/00* (2006.01)
*B29D 30/08* (2006.01)

(52) U.S. Cl. .................. 156/110.1; 152/516; 152/517; 152/539; 152/548; 156/123; 156/133

(58) Field of Classification Search ................ 152/516, 152/517, 539; 156/110.1
See application file for complete search history.

(56) References Cited

U.S. PATENT DOCUMENTS

| | | | | |
|---|---|---|---|---|
| 4,215,735 A | * | 8/1980 | Sato | 152/454 |
| 5,634,993 A | | 6/1997 | Drieux et al. | |
| 5,871,602 A | | 2/1999 | Paonessa et al. | |
| 5,968,294 A | * | 10/1999 | Willard et al. | 152/517 |

(Continued)

FOREIGN PATENT DOCUMENTS

EP 0 475 258 A1 3/1992

(Continued)

*Primary Examiner*—Blaine Copenheaver
*Assistant Examiner*—Justin Fischer
(74) *Attorney, Agent, or Firm*—Finnegan, Henderson, Farabow, Garrett & Dunner, L.L.P.

(57) ABSTRACT

A self-supporting tyre (1) has reinforcing structures at the beads (4) defining rest surfaces (4*a*) for a corresponding rim (1*a*) which have a profile converging towards the tyre rotation axis away from the equatorial plane (X-X) of the tyre itself. The carcass plies (3*a,* 3*b*) are each made by sequential deposition of strip-like sections circumferentially distributed on a toroidal support (11). Elastic-support inserts (16, 21) are interposed between the side portions (13*a,* 14*a*) of axially internal sections (13), axial intermediate sections (15). In this manner around at least one of said support inserts opening degree of which can be modulated depending on requirements, by modifying the land/empty space ratio determined by the distance existing between the side portions (13*a,* 14*a,* 15*a*) of the strip-like sections (13, 14, 15) covering each of the axially opposite sides of the support insert itself.

49 Claims, 10 Drawing Sheets

U.S. PATENT DOCUMENTS

| | | | | |
|---|---|---|---|---|
| 5,971,047 | A | 10/1999 | Drieux et al. | |
| 6,374,888 | B1 * | 4/2002 | Willard et al. | 152/517 |
| 6,814,119 | B1 | 11/2004 | Caretta et al. | |

FOREIGN PATENT DOCUMENTS

| | | | |
|---|---|---|---|
| EP | 0 542 252 | B1 | 5/1993 |
| EP | 0 884 110 | A2 | 5/1998 |
| EP | 0 919 406 | B1 | 6/1999 |
| EP | 0 928 680 | B1 | 7/1999 |
| EP | 0 928 702 | B1 | 7/1999 |
| EP | 0 976 535 | A2 | 2/2000 |
| GB | 2087805 | A | 6/1982 |
| WO | WO 99/64225 | | 12/1999 |
| WO | WO 00/35666 | | 6/2000 |
| WO | WO 00/38906 | | 7/2000 |
| WO | WO 01/36185 | A1 | 5/2001 |

* cited by examiner

SELF-SUPPORTING TYRE FOR VEHICLE WHEELS AND METHOD FOR MANUFACTURING THE SAME

CROSS-REFERENCE TO RELATED APPLICATIONS

This application is a national-phase entry under 35 U.S.C. § 371 from International Application No. PCT/EP01/14100, filed Dec. 3, 2001, in the European Patent Office, the contents of which are relied upon and incorporated herein by reference; additionally, Applicant claims the right of priority under 35 U.S.C. § 119(a)–(d) based on patent application No. 00830845.4, filed Dec. 22, 2000, in the European Patent Office; further, Applicant claims the benefit under 35 U.S.C. § 119(e) based on provisional application No. 60/265,616, filed Feb. 2, 2001, in the U.S. Patent and Trademark Office.

BACKGROUND OF THE INVENTION

Field of the Invention

The present invention relates to a self-supporting tyre for vehicle wheels, comprising: a carcass structure having at least one carcass ply provided with end flaps in engagement with respective annular reinforcing structures disposed in coaxial relationship with a rotation axis of the tyre at positions axially spaced apart from each other and each incorporated into a tyre bead, at least one of said beads exhibiting, at a radially internal position thereof, a rest surface that, in a diametrical section plane of the tyre, defines a profile converging towards the rotation axis of the tyre itself away from an equatorial plane of the same; a belt structure applied to the carcass structure at a radially external position thereof; a tread band applied to the belt structure at a radially external position thereof; at least one pair of sidewalls each extending between one of said beads and a side edge of the tread band, at an axially external position with respect to the carcass structure.

The present invention also relates to a method of manufacturing a self-supporting tyre for vehicle wheels, comprising the steps of: preparing a carcass structure having at least one carcass ply provided with end flaps in engagement with respective annular reinforcing structures disposed in coaxial relationship with a rotation axis of the tyre at positions axially spaced apart from each other and each incorporated into a tyre bead, at least one of said beads exhibiting, at a radially internal position thereof, a rest surface that, in a diametrical section plane of the tyre, defines a profile converging towards the rotation axis of the tyre itself away from an equatorial plane thereof; applying a belt structure to the carcass structure at a radially external position thereof; applying a tread band to the belt structure at a radially external position of same; applying a pair of sidewalls to the carcass structure, at laterally opposite positions of the latter, each of said sidewalls extending between one of said beads and a side edge of the tread band.

Tyres for vehicle wheels essentially comprise a carcass structure made up of one or more carcass plies that, in the most typical solutions, have the respective inner circumferential edges turned up around inextensible annular inserts being part of annular reinforcing structures and placed at axially opposite positions in the regions usually identified as tyre "beads".

Applied to the carcass ply or plies, at a radially external position, is a belt structure comprising one or more belt layers radially superposed in succession. Radially superposed on the belt structure is a tread band of elastomer material. The outer sides of the carcass structure are also covered with respective sidewalls made of elastomer material as well.

It is to be pointed out that, to the aims of the present invention, by the term "elastomer material" it is intended a rubber blend in its entirety, that is the assembly made up of at least one base polymer suitably amalgamated with reinforcing fillers and/or process additives of various types.

Usually the tyre beads, and in particular the annular reinforcing structures incorporated thereinto, are conveniently structured and shaped so as to match with the respective circumferential seats arranged on a rim with which the tyre is to be associated, to ensure a steady connection between the two components of a wheel.

In more detail, coupling between each bead and the corresponding circumferential seat of the rim is of such a nature that the bead is constantly pushed, by effect of the tyre inflation pressure, against an abutment shoulder radially jutting out away from the rotation axis of the tyre and defining the axially external edge of the rim. At least in tubeless tyres, i.e. tyres devoid of an air tube, each circumferential seat for engagement of the bead has a frusto-conical surface, hereinafter referred to as "flange", having an extension converging towards the rotation axis on moving close to the equatorial plane of the tyre. Each bead, axially pushed away from the equatorial plane by effect of the inflation pressure, acts in axial thrust relationship against the respective flange so as to ensure a perfect air-tightness to the tyre.

Recently wheels for vehicles have been proposed in which the engagement seats of the tyre beads have a frusto-conical conformation with an extension converging towards the rotation axis away from the equatorial plane. An example of such a rim-tyre assembly is described in U.S. Pat. No. 5,634,993. In the embodiment proposed in such a patent, the tyre beads the shape of which matches that of the corresponding rim seats, have annular reinforcing structures comprising usual rings around which the end flaps of the carcass ply are axially turned up. As a whole the carcass structure, of the radial type, has a cross-section profile with a constant bending direction, the tangent of which close to the rings is substantially parallel to the equatorial plane.

In document U.S. Pat. No. 5,971,047 a tyre is described which has beads particularly adapted for use on rims having frusto-conical flanges axially facing outwardly, hereinafter referred to, for the sake of simplicity, as "reverse-flange" rims.

The Applicant has already proposed, in document WO 99/64225, technical improvements particularly addressed to simplification of the production process for tyres provided with beads adapted for a reverse-flange rim.

It is the Applicant's feeling that the technical problem to be solved for the purposes of the present invention is to obtain further functional improvements in the above mentioned tyre, particularly in connection with ride comfort, by envisaging new technical solutions aiming at achieving the desired self-support qualities, i.e. the capability of ensuring ride over short-medium runs in the absence of inflation pressure, following a puncture for example.

In the above United States documents U.S. Pat. Nos. 5,674,993 and 5,971,047, for self-support purposes, use of a big ring of elastomer material is proposed which is fitted on the rim and arranged to provide a rest seat at the tyre belt to conveniently support the structure during running under deflated conditions. Unlike the solutions found in traditional tyres to be used on rims having flanges diverging away from the equatorial plane, hereinafter referred to as "right-flange"

rims, the tyre structure having beads adapted for a reverse flange is capable of ensuring by itself, at least within limits, a good anchoring of the beads to the corresponding rim flanges even under deflated conditions of the tyre. Use of the elastomer support ring fitted on the rim is therefore presently preferred to the other known solutions commonly adopted on tyres having beads for right flanges, as described in documents GB 2087805, EP 475258 and EP 542252 for example, which obtain self-support by arranging appropriate elastomer reinforcement inserts, usually referred to as "lunettes" at the sidewalls, in combination with suitably strengthened beads to promote steadiness of engagement of the latter on the respective flanges.

Examples of such embodiments are described in documents GB 2087805, EP 475258 and EP 542252, in which at least one of the elastic-support inserts present at each sidewall is enclosed between two carcass plies forming a sort of closed container around it, so as to achieve good results particularly in connection with the self-supporting capability of the tyre under deflated conditions.

The Applicant has however understood that, above all on low-section tyres, i.e. tyres in which the height/width ratio is, just as an indication, lower than 0.60, the presence of the annular elastomer insert within the tyre as described in documents U.S. Pat. Nos. 5,674,993 and 5,971,047 may impair ride comfort of the tyre even under normal use conditions. In fact, the tyre crown portion may easily come into contact with the radially external portion of the annular insert, at the ground-contacting area, above all following impacts transmitted by unevennesses in the road surface, causing direct transmission of the impacts to the vehicle suspensions. In addition, the annular elastomer insert greatly reduces the amount of air in the tyre, the elastic behaviour of which is one of the decisive factors for ride comfort purposes.

The Applicant has also understood that location of the elastic-support inserts in a sort of closed container defined by the carcass plies turned up around the annular anchoring structures, as suggested in documents GB 2087805, EP 475258 and EP 542252, tends to greatly increase stiffness of the tyre sidewall not only with reference to its vertical flexibility, i.e. in connection with substantially radial stresses with respect to the rotation axis of the tyre, but also with reference to its torsional flexibility, i.e. in connection with stresses directed tangentially of the circumferential extension of the tyre itself.

By adopting particular expedients, as described in documents EP 475258 and EP 542252 in the name of the same Applicant for example, the possibility of restricting, within limits, the vertical stiffness of the sidewall under running conditions with an inflated tyre is achieved. On the other hand, these technical solutions tend to make the tyre structure heavier and more complicated and are not efficient for the purpose of limiting the torsional stiffness which, as found out by the Applicant, is one of the decisive factors in terms of ride comfort, particularly at medium/high speed. in fact, the tyre capability of absorbing impacts transmitted by potholes or other unevennesses present in a road surface depends on the torsional stiffness of the tyre.

The Applicant has also understood that during running under normal inflated conditions and, even more so, under deflated conditions, the presence of the elastic-support inserts completely enclosed between two carcass plies imposes strong stresses and/or deformations to the inserts themselves as well as to the other tyre construction components that are present close to the sidewalls, which will bring about an increase in the operating temperatures and softening of the materials. Thus use of materials having high moduli of elasticity is compulsory, in order to further increase ride comfort with an inflated tyre.

In accordance with the present invention, it has been found that if in tyres having reverse-flange beads technical solutions are adopted that aim at achieving self-support qualities through insertion of elastomer inserts within the sidewalls, instead of the traditional elastomer ring fitted on the rim, unexpected improvements in the tyre behaviour can be reached, above all in terms of ride comfort.

It has also been found that use of these technical solutions make it surprisingly possible to manufacture a tyre using simplified production processes based on the principles described in the above mentioned document WO 99/64225, also obtaining the possibility of modulating at will, depending on requirements, the containment degree exerted by the carcass structure on the elastomer inserts disposed at the sidewalls.

In more detail, it is an object of the present invention to provide a self-supporting tyre for vehicle wheels, characterized in that it further comprises at least one pair of elastic-support inserts incorporated into the carcass structure, each at one of said sidewalls.

More particularly, the elastic-support inserts have respective radially internal apices placed close to the beads, and radially external apices placed close to the side edges of the tread band.

In a preferential embodiment of the-invention, said at least one carcass ply comprises: axially internal strip-like sections and axially external strip-like sections, said axially internal and axially external sections being circumferentially distributed around said rotation axis and each extending in a "U"-shaped configuration around the cross-section profile of the carcass structure, to define two side portions mutually spaced apart in an axial direction and a crown portion extending in a radially external position between the side portions, said elastic-support inserts being each axially interposed between side portions of the axially internal sections and side portions of the axially external sections.

Also provided may be the presence of axially intermediate strip-like sections circumferentially distributed around said rotation axis and each extending in a "U"-shaped configuration around the cross-section profile of the carcass structure to define two side portions overlapping, in an axially external position, said elastic-support inserts, and a crown portion extending in a radially external position between the side portions; a pair of auxiliary elastic-support inserts being each axially interposed between the side portions of the axially intermediate sections and the side portions of the axially external sections.

In more detail, the axially internal sections are preferably distributed according to a circumferential pitch corresponding to a multiple of their width, the axially intermediate sections are distributed according to a circumferential pitch corresponding to a multiple of their width and each have the respective crown portion interposed in circumferential approaching relationship between the crown portion of two axially internal sections, to define a first carcass ply therewith, and the axially external sections are distributed according to a circumferential pitch substantially corresponding to their width, to define a second carcass ply radially superposed on the first carcass ply close to said crown portions.

In addition to the above, the presence of second axially intermediate strip-like sections may be also provided, which second sections are circumferentially distributed around said rotation axis and each extend in a "U"-shaped configuration around the cross-section profile of the carcass structure to define two side portions partly overlapping, at an axially external position, the side portions of the first axially intermediate sections, and a crown portion extending in a radially external-position between the respective side portions.

In a possible preferential alternative embodiment, the axially internal sections are distributed according to a circumferential pitch substantially corresponding to a multiple of their width, the first axially intermediate sections are distributed according to a circumferential pitch substantially corresponding to a multiple of their width, each with the respective crown portion interposed in circumferential approaching relationship between the crown portion of two axially internal sections, to define a first carcass ply therewith, the second axially intermediate sections are distributed according to a circumferential pitch substantially corresponding to a multiple of their width, and the axially external sections are distributed according to a circumferential pitch substantially corresponding to a multiple of their width, each with the respective crown portion interposed in circumferential approaching relationship between the crown portions of two of said second axially intermediate sections, to define a second carcass ply therewith, which second carcass ply is radially superposed on the first carcass ply close to said crown portions.

According to a further preferential alternative embodiment, the axially internal sections are distributed according to a circumferential pitch substantially corresponding to their width, to define a first carcass ply, the axially intermediate sections are distributed according to a circumferential pitch corresponding to a multiple of their width and the axially external sections are distributed according to a circumferential pitch corresponding to a multiple of their width and each have the respective crown portion interposed in a circumferential approaching relationship between the crown portions of two axially intermediate sections, to define a second carcass ply therewith, which second carcass ply is radially superposed on the first carcass ply close to said crown portions.

The inner, intermediate and outer sections respectively can also be distributed according to a circumferential distribution pitch which is a multiple of their width in accordance with a numerical factor corresponding to the number of series of inner, intermediate and outer sections provided in the formation process of said at least one carcass ply.

Under this circumstance, the crown portions of the individual inner, intermediate and outer sections are sequentially alternated in mutual approaching relationship along one and the same circumferential line, whereas the respective side portions are axially offset from each other to house at least one of said elastic-support inserts in the spaces existing between the side portions of the inner and intermediate sections, and between the side portions of the intermediate and outer sections.

In accordance with a further alternative embodiment, the axially internal sections are distributed according to a circumferential pitch substantially corresponding to a multiple of their width, the axially intermediate sections are distributed according to a circumferential pitch substantially corresponding to a multiple of their width and each have the respective crown portion disposed circumferentially close to the crown portion of an axially internal section, and the axially external sections are distributed according to a circumferential pitch substantially corresponding to a multiple of their width, each with its crown portion in circumferential approaching relationship between the crown portion of one of the axially internal sections and the crown portion of one of the axially intermediate sections to define said at least one carcass ply therewith.

In a further possible embodiment, the axially internal sections are distributed according to a circumferential pitch substantially corresponding to a multiple of their width, the axially external sections each having the respective crown portion interposed in circumferential approaching relationship between the crown portions of two axially internal sections.

Alternatively, the axially internal sections and axially external sections are distributed according to a circumferential pitch corresponding to the width of each section, to define a first carcass ply and a second carcass ply respectively, the second carcass ply being radially superposed on the first carcass ply close to said crown portions.

Also provided may be the presence of a pair of auxiliary elastic-support inserts each disposed at an axially internal position with respect to the axially internal sections.

In a further preferential alternative embodiment, each of said strip-like sections substantially extends in a plane parallelly offset from a meridian plane of the tyre, so that the respective crown portion, with respect to a radial reference plane passing through the transition point between the crown portion and at least one of the corresponding side portions, is oriented in such a manner as to form an angle of a value different from the inclination exhibited by the side portions.

In more detail, the axially internal sections and axially external sections lie in deposition planes that at respectively opposite sides are offset from said meridian plane, so that at least the side portions of the axially internal sections have a crossed orientation relative to the side portions of the axially external sections.

In accordance with a further inventive aspect, at least one of said annular reinforcing structures comprises: at least one stiffening element applied against said at least one carcass ply and having a cross-section profile extending away from the rotation axis of the tyre; at least one annular circumferentially-inextensible anchoring insert having a cross-section profile of flattened conformation, extending axially away from,the stiffening element in a direction converging towards the geometric rotation axis of the tyre away from the equatorial plane thereof.

The cross-section profile of the annular reinforcing structure is advantageously provided to have a geometric centre of gravity located at such a position that an axially external end edge of said annular anchoring insert is pushed towards the rotation axis of the tyre following a tension generated along said at least one carcass ply by effect of the inflation pressure of the tyre.

In more detail, the cross-section profile of the annular reinforcing structure has a geometric centre of gravity located at an axially external position relative to said stiffening element and at an axially internal position relative to an axially external end edge of said annular anchoring insert.

Preferably, said stiffening element is axially positioned between a respective axially internal end flap and a respective axially external end flap of said at least one carcass ply.

Said annular anchoring insert is also provided to be applied against an end portion of the outer end flap, extending axially away from the equatorial plane of the tyre. In more detail, said annular anchoring insert is applied at a radially external position with respect to said end portion of the outer end flap.

It is also provided that the annular anchoring insert should be disposed substantially close to a radially internal edge of the stiffening element.

The annular reinforcing structure may further comprise at least one auxiliary annular anchoring insert parallel to and radially close to said annular anchoring insert.

Such an auxiliary anchoring insert is preferably applied at a radially external position with respect to an end portion of said inner end flap, and extends axially away from an equatorial plane of the tyre.

The auxiliary anchoring insert is preferably applied at a radially internal position relative to said end portion of the outer end flap.

The presence of at least one auxiliary circumferentially-inextensible stiffening element may be also provided, which auxiliary element has a cross-section profile radially extending at an axially internal position relative to said stiffening element.

It is a further object of the present invention a tyred wheel for vehicles comprising a mounting rim to be associated with a hub of a vehicle and a tyre mounted on said rim, said tyre comprising the above described features.

In accordance with a further aspect of the present invention, said tyre can be obtained by a method of manufacturing a self-supporting tyre for vehicle wheels, characterized in that, concurrently with preparation of said at least one carcass ply, also carried out is a step of incorporating into the carcass structure at least one pair of elastic-support inserts, each at one of said sidewalls. Preparation of the carcass structure preferably comprises the following steps: arranging strip-like sections each comprising longitudinal and parallel thread-like elements; laying down axially internal strip-like sections circumferentially distributed on the toroidal support, each of said axially internal sections extending in a "U"-shaped configuration around the cross-section profile of the toroidal support, to define two side portions that are mutually spaced apart in an axial direction, and a crown portion extending in a radially external position between the side portions; applying said elastic-support inserts in a position axially external to the side portions of the axially internal sections; laying down axially external strip-like sections circumferentially distributed on the toroidal support, each of said axially external sections extending in a "U"-shaped configuration around the cross-section profile of the toroidal support, to define two side portions that are mutually spaced apart in an axial direction, each extending in an axially external position relative to one of the elastic-support inserts, and a crown portion extending in a radially external position between the side portions.

In a possible embodiment, before laying down the axially external sections the following further steps are carried out: laying down axially intermediate strip-like sections circumferentially distributed around said rotation axis and each extending in a "U"-shaped configuration around the cross-section profile of the carcass structure to define two side portions overlapping, at an axially external position, said elastic-support inserts, and a crown portion extending in a radially external position between the side portions; applying a pair of auxiliary elastic-support inserts, at an axially external position, to the side portions of the axially intermediate sections, before deposition of the axially external sections.

In particular, it may be provided that the axially internal sections should be laid down according to a circumferential distribution pitch substantially corresponding to a multiple of their width, the axially intermediate sections should be laid down according to a circumferential distribution pitch substantially corresponding to a multiple of their width, each with the respective crown portion interposed in a circumferential approaching relationship between the crown portions of two axially internal sections, to define a first carcass ply therewith, and the axially external sections should be laid down according to a circumferential distribution pitch substantially corresponding to their width, to define a second carcass ply therewith, which carcass ply is radially superposed on the first carcass ply.

In a possible preferential embodiment, before application of said auxiliary elastic-support insert, also carried out is the step of laying down second axially-intermediate strip-like sections circumferentially distributed around said rotation axis and each extending in a "U"-shaped configuration around the cross-section profile of the toroidal support to define two side portions partly overlapping, at an axially external position, the side portions of the first axially intermediate sections previously laid down, and a crown portion extending in a radially external position between the respective side portions.

In particular, the axially internal sections are laid down according to a circumferential distribution pitch substantially corresponding to a multiple of their width, the first axially intermediate sections are laid down according to a circumferential distribution pitch substantially corresponding to a multiple of their width, each having the respective crown portion interposed in a circumferential approaching relationship between the crown portions of two axially internal sections, to define a first carcass ply therewith, the second axially intermediate sections are laid down according to a circumferential distribution pitch substantially corresponding to a multiple of their width, and the axially external sections are laid down according to a circumferential distribution pitch substantially corresponding to a multiple of their width, each having the respective crown portion interposed in a circumferential approaching relationship between the crown portions of two of said second axially intermediate sections, to define a second carcass ply therewith.

Alternatively, the axially internal sections are laid down according to a circumferential distribution pitch substantially corresponding to their width, to define a first carcass ply, the axially intermediate sections are laid down according to a circumferential distribution pitch substantially corresponding to a multiple of their width, and the axially external sections are laid down according to a circumferential distribution pitch substantially corresponding to a multiple of their width, each having the respective crown portion interposed in a circumferential approaching relationship between the crown portions of two of said intermediate sections, to define a second carcass ply therewith, which carcass ply is radially superposed on the first carcass ply close to said crown portions.

In a further possible embodiment, the axially internal sections are laid down according to a circumferential distribution pitch substantially corresponding to a multiple of their width, the axially intermediate sections are laid down according to a circumferential distribution pitch substantially corresponding to a multiple of their width, each having the respective crown portion disposed circumferentially close to the crown portion of an axially internal section, and the axially external sections are laid down according to a circumferential pitch substantially corresponding to a multiple of their width, each having its crown portion in circumferential approaching relationship between the crown portion of one of the axially internal sections and the crown portion of one of the axially intermediate sections, to define said at least one carcass ply therewith.

Alternatively, the axially internal sections are distributed according to a circumferential pitch substantially corresponding to a multiple of their width, the axially external sections being each laid down with their crown portion in circumferential approaching relationship between the crown portions of two axially internal sections.

According to a further alternative embodiment, the axially internal sections are distributed according to a circumferential pitch substantially corresponding to their width to define a first carcass ply, and the axially external sections are distributed according to a circumferential pitch substantially corresponding to their width to define a second carcass ply radially superposed on the first carcass ply close to said crown portions.

Also preferably provided is the step of arranging a pair of auxiliary elastic-support inserts, each at an axially internal position relative to the axially internal sections.

In addition, each of said strip-like sections may be provided to be laid down in a plane parallelly offset from a meridian plane of the toroidal support.

In particular, the axially internal sections and axially external sections are respectively laid down in deposition planes that are offset at respectively opposite sides from said meridian plane, so that the side portions of the axially internal and axially external sections have respectively inclined orientations.

In accordance with a further inventive aspect, accomplishment of at least one of said annular anchoring structures comprises the steps of: applying at least one annular circumferentially-inextensible anchoring insert in radial superposed relationship with an end portion of at least one of said end flaps, said anchoring insert having a cross-section profile of flattened conformation extending axially away from the corresponding inner end flap and from an equatorial plane of the tyre; applying at least one stiffening element against said at least one end flap, said stiffening element being substantially placed at an axially internal position relative to said annular anchoring insert and having a cross-section profile extending away from said rotation axis.

Application of said annular anchoring insert preferably takes place by winding up of at least one thread-like element in concentric coils disposed axially close to each other around the toroidal support, and can be carried out subsequently to deposition of the axially external sections.

In a preferential embodiment, application of the stiffening element is carried out before application of the annular anchoring insert and before deposition of the axially external sections.

Application of said at least one stiffening element is also preferably provided to take place by winding up of at least one thread-like element in concentric coils that are radially superposed around the toroidal support.

Also carried out may be the further step of applying an auxiliary circumferentially-inextensible annular anchoring insert, disposed substantially parallel and radially close to said annular anchoring insert.

In particular, said auxiliary anchoring insert is preferably applied subsequently to deposition of the radially internal sections and before deposition of the radially external sections, by winding up of at least one thread-like element in concentric coils disposed axially close to each other around the toroidal support.

In accordance with a preferential embodiment, before applying said stiffening element, application of at least one auxiliary stiffening element radially extending in an axially internal position relative to the stiffening element itself, is carried out.

BRIEF DESCRIPTION OF THE DRAWING

Application of said auxiliary stiffening element preferably takes place by winding up of at least one thread-like element in concentric coils disposed radially close to each other around the toroidal support.

It is also preferably provided that each of said elastic-support inserts should be formed by winding up at least one continuous strip-like element of elastomer material in the form of coils that are disposed axially close to, and/or radially superposed on, each other around the geometric axis of the toroidal support.

Figure 1:
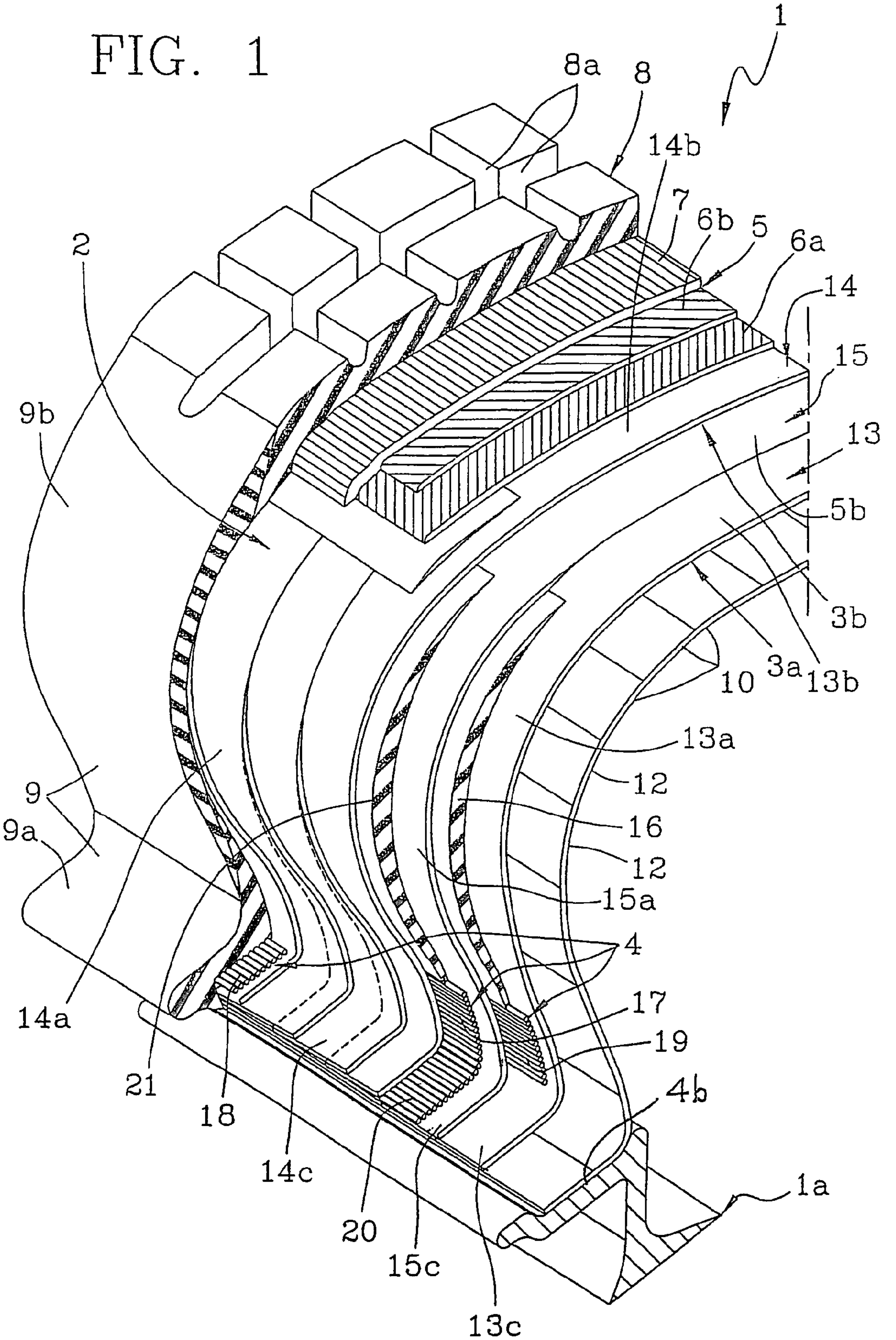
Figure 2:
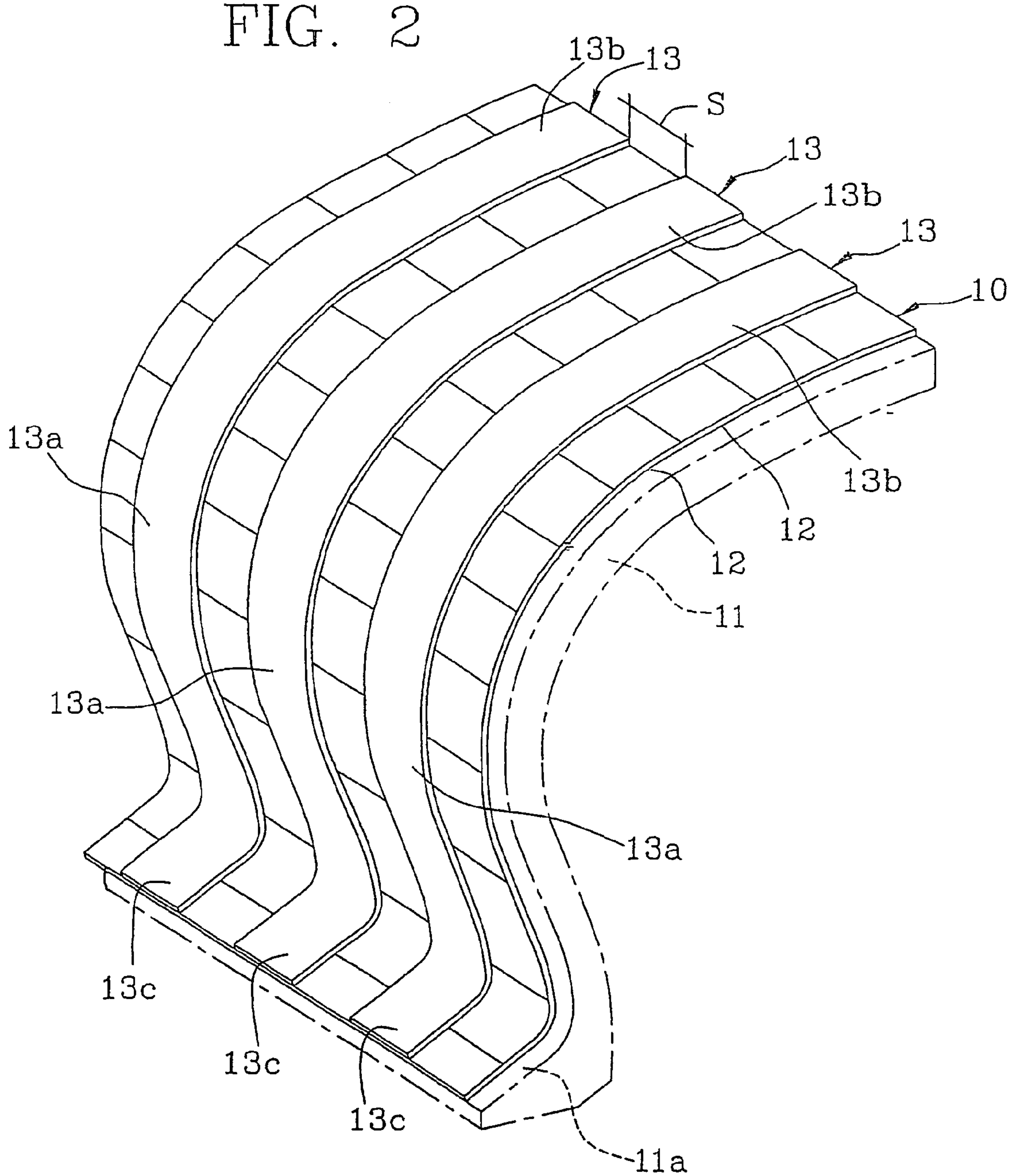
Figure 3:
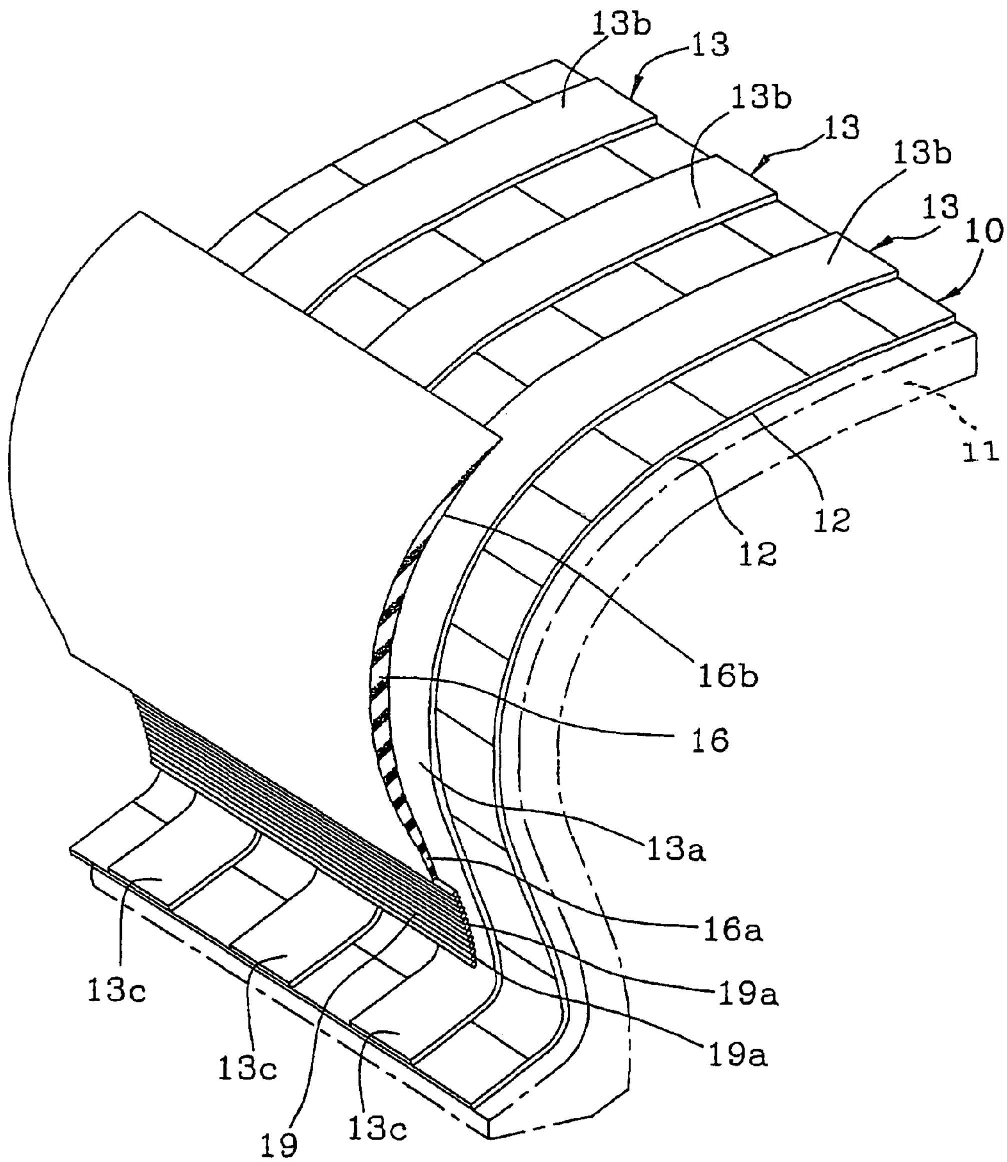
Figure 4:
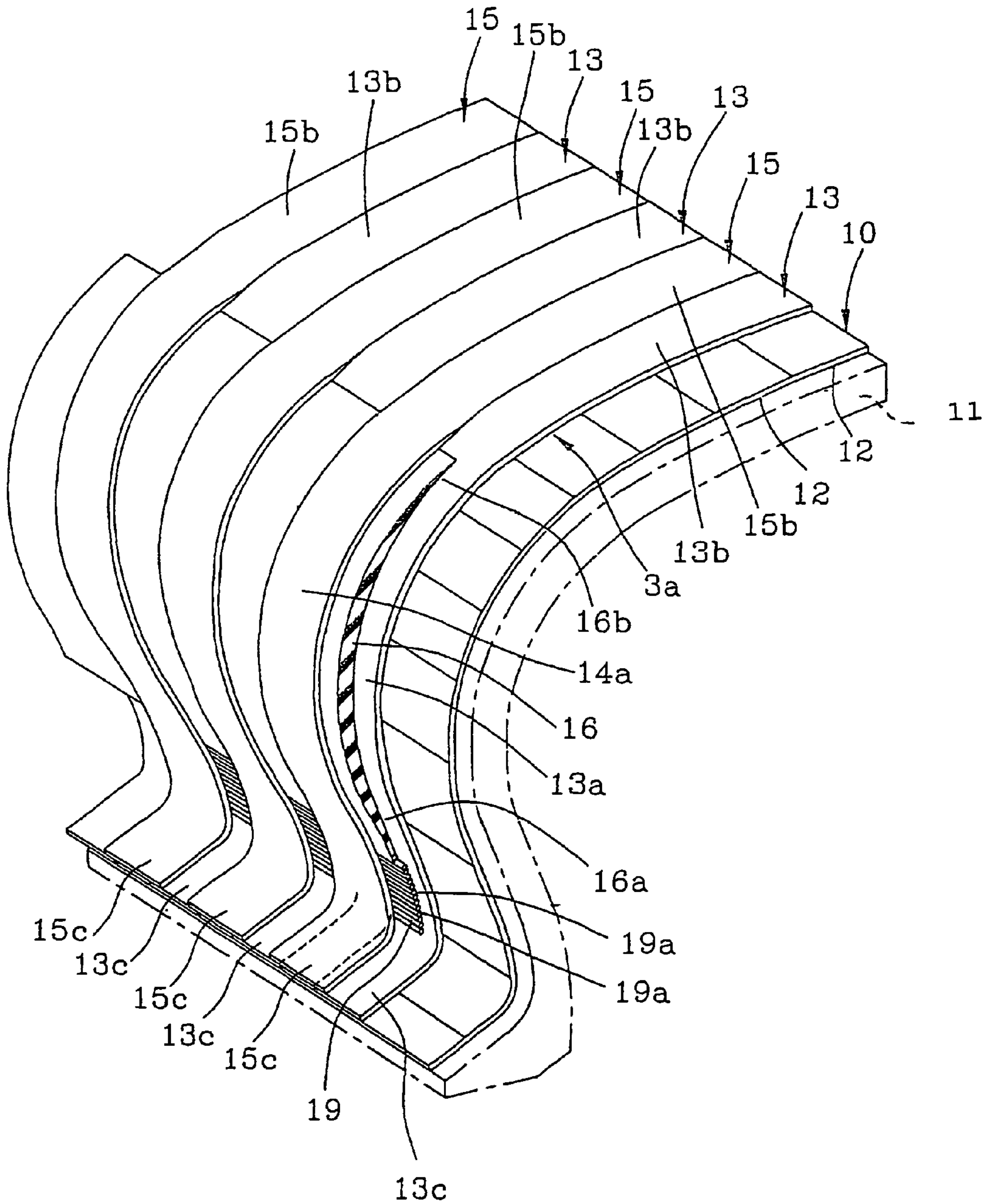
Figure 5:
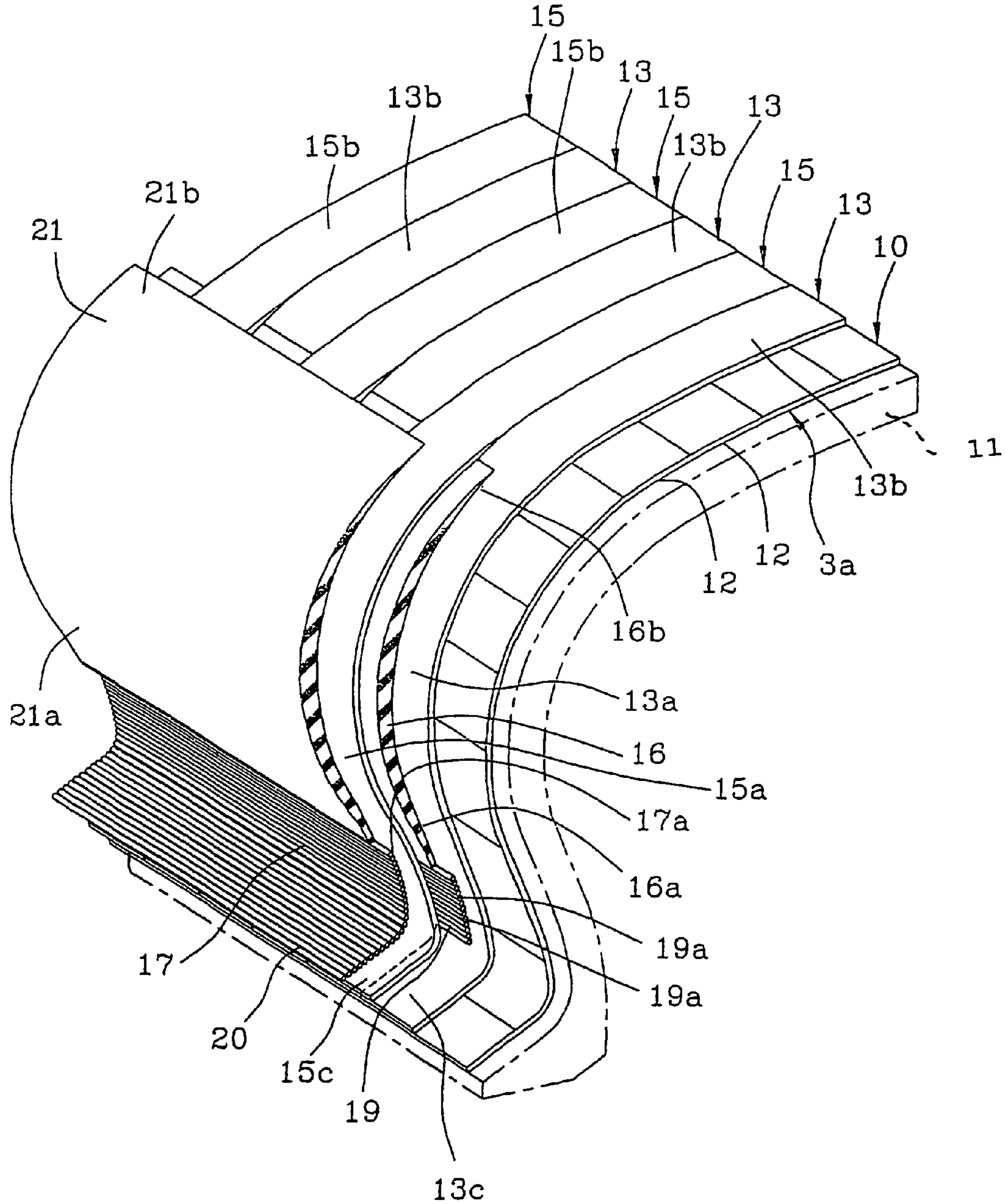
Figure 6:
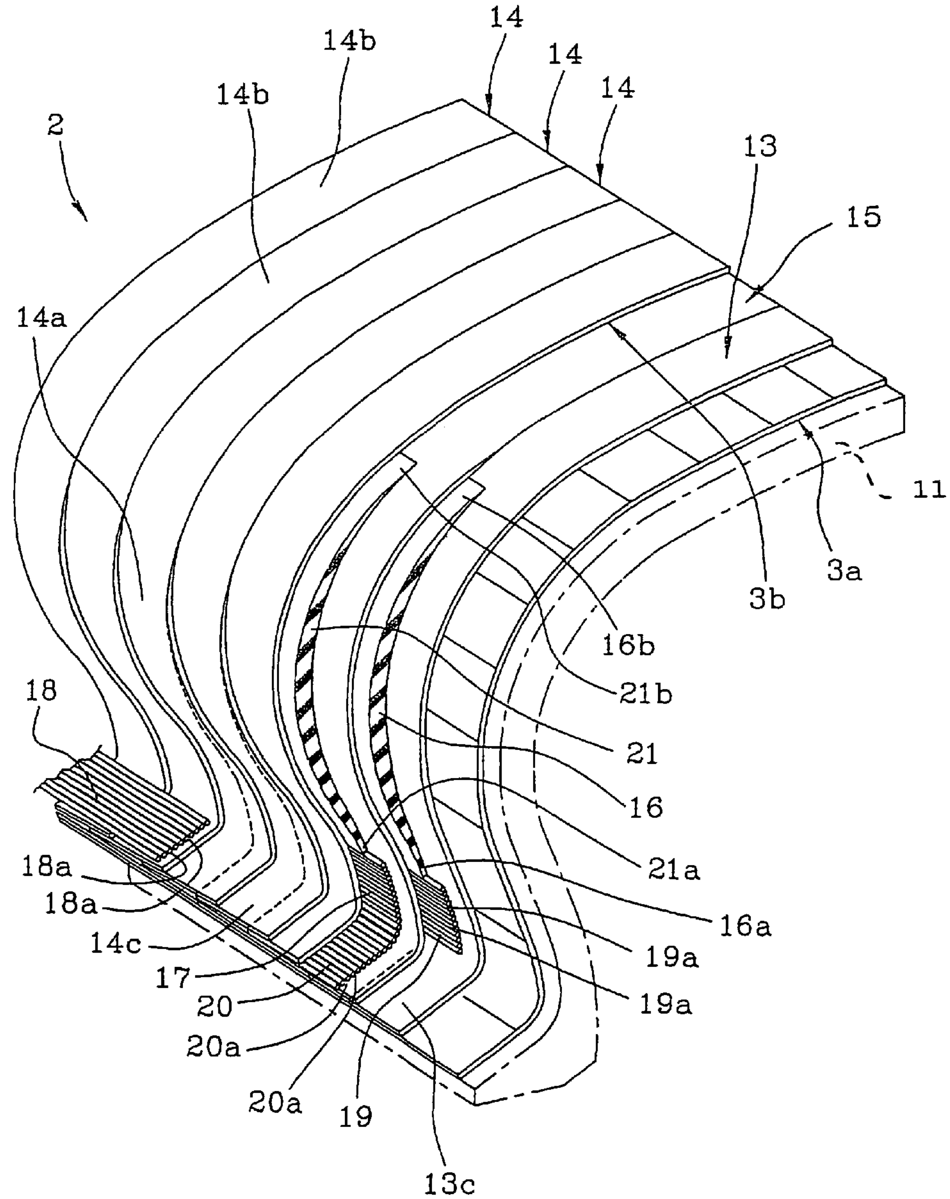
Figure 7:
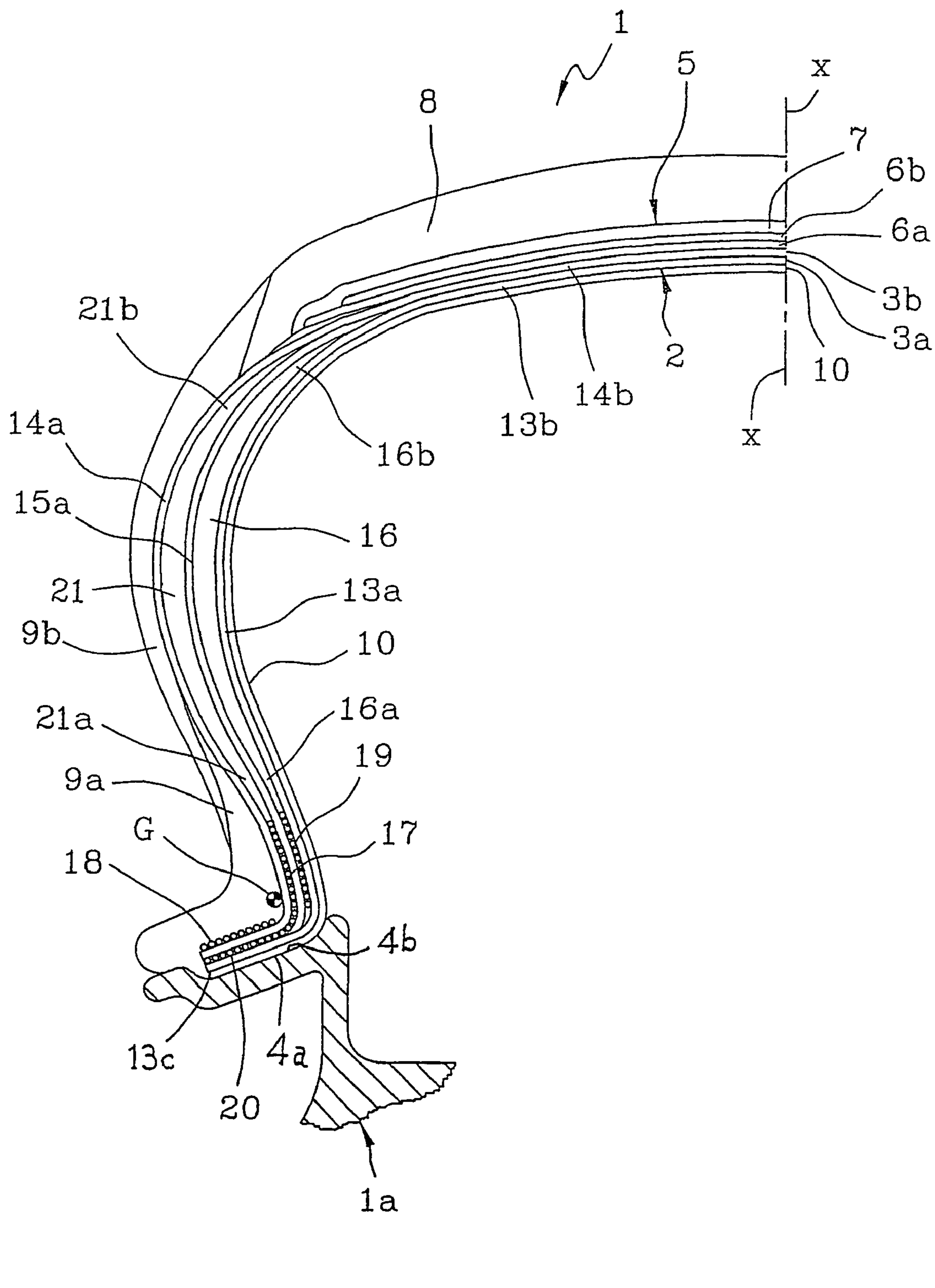
Figure 8:
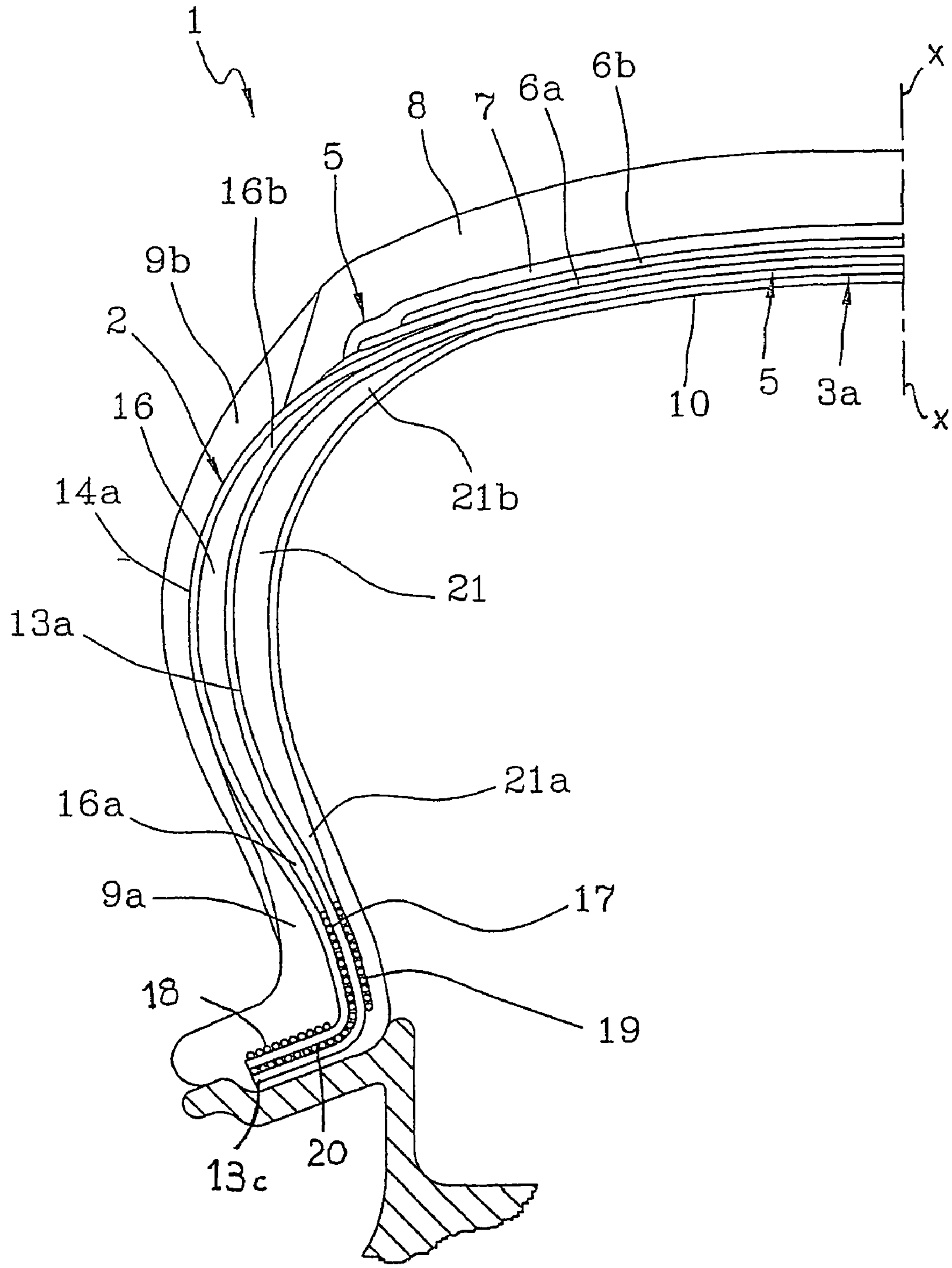
Figure 9:
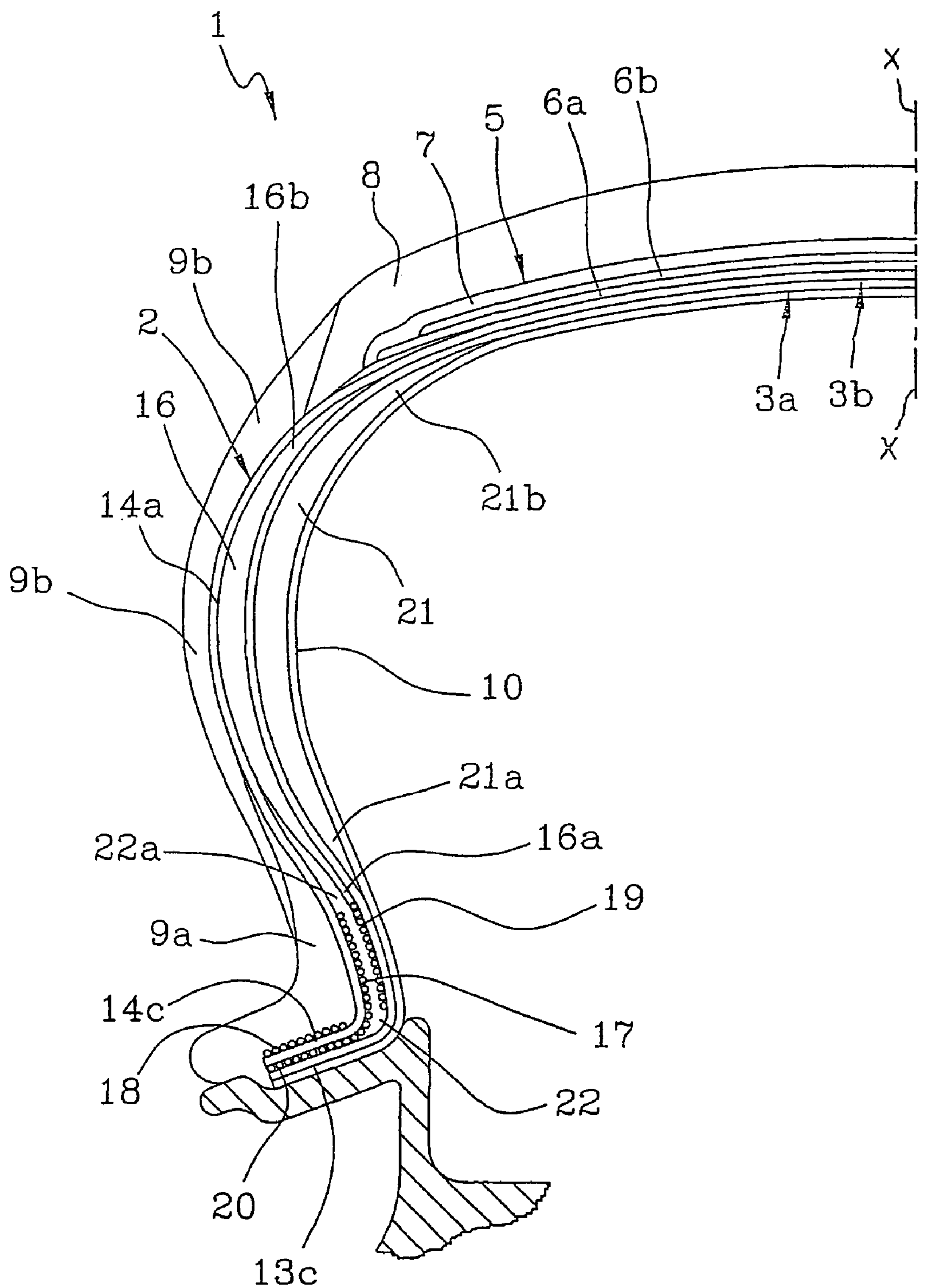
Figure 10:
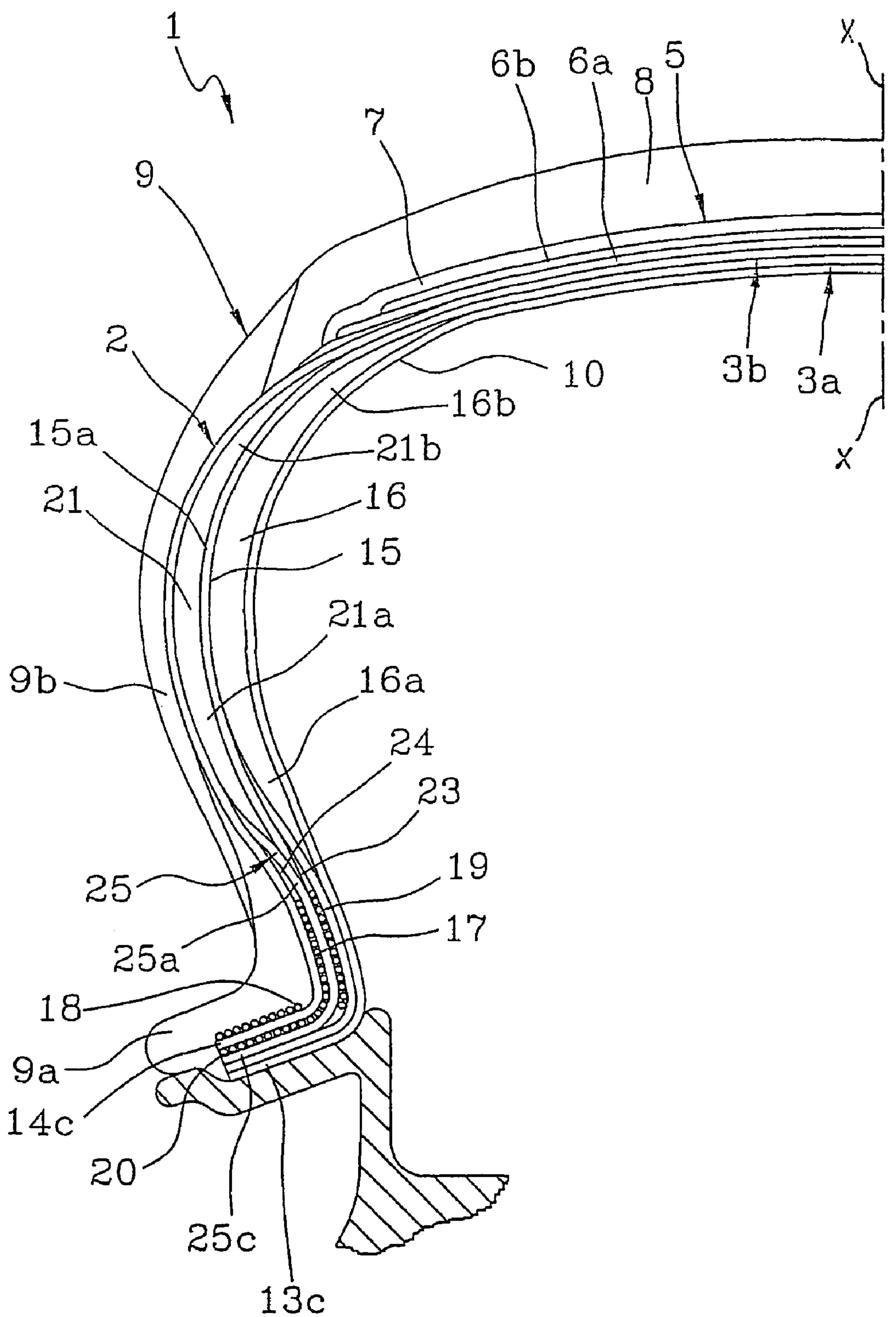

Further features and advantages will become more apparent from the detailed description of a preferred but, not exclusive embodiment of a self-supporting tyre for vehicle wheels and a method of manufacturing the same, in accordance with the present invention. This description will be set out hereinafter with reference to the accompanying drawings, given by way of non-limiting example, in which:

FIG. 1 is a fragmentary and split perspective view of a tyre made in accordance with the present invention, mounted on a respective rim;

FIG. 2 diagrammatically shows a fragmentary perspective view of the deposition sequence of axially internal strip-like sections, designed to form a carcass ply of the tyre in accordance with the invention;

FIG. 3 is a fragmentary perspective view of an elastic-support insert and an auxiliary stiffening element being part of an annular reinforcing structure, applied to one of the sides of the carcass structure;

FIG. 4 is a fragmentary perspective view showing application of intermediate strip-like sections the-side portions of which are placed in superposed relationship with the elastic-support insert and the auxiliary stiffening element previously applied;

FIG. 5 is a fragmentary perspective view of an auxiliary anchoring insert and a stiffening element being part of the above mentioned annular reinforcing structure, as well as of an auxiliary elastic-support insert applied against the side portions of the first axially intermediate sections, in radial extension relationship with respect to the stiffening element;

FIG. 6 is still a fragmentary perspective view showing axially external strip-like sections applied, at said respective side portions, against the auxiliary elastic-support insert, and an annular anchoring insert being part of the annular anchoring structure, applied against the end portions of the axially external sections;

FIG. 7 is a cross half-section of the tyre made, in accordance with the preceding figures;

FIG. 8 is a diametrical half-section of a second embodiment of a tyre in accordance with the present invention;

FIG. 9 is a diametrical section of a further alternative embodiment of a tyre in accordance with the present invention;

FIG. 10 is a diametrical section of a fourth embodiment of the concerned tyre.

DETAILED DESCRIPTION OF THE EXEMPLARY EMBODIMENTS

With reference to the drawings, a tyre for vehicle wheels having a carcass structure 2 made by a method in accordance with the present invention has been generally identified by reference numeral 1.

In the embodiment shown in FIGS. 1 to 7, the carcass structure 2 has a first and a second carcass plies 3*a,* 3*b* shaped in a substantially toroidal conformation and in engagement, through their axially opposite circumferential edges, with a pair of annular anchoring structures 4 (only one of which is shown in the drawings), each of which is disposed, when the tyre manufacture has been completed, in the region usually defined as "bead" which, at a radially internal position, is provided with a rest surface 4*a* defining a profile converging, in a diametrical section plane of the tyre, towards the rotation axis of the tyre itself away from an equatorial plane X-X thereof.

Each rest surface 4*a* is adapted to operatively engage with an engagement seat 4*b* provided on a corresponding mounting rim 1*a*, to ensure anchoring of tyre 1 to the rim itself.

Applied to the carcass structure 2, at a radially external position, is a belt structure 6 comprising one or more belt strips 6*a*, 6*b* and 7. Circumferentially superposed on the belt structure 5 is a tread band 8 in which, following a moulding operation carried out concurrently with vulcanization of the tyre, longitudinal and transverse grooves 8a are formed and conveniently disposed to define the desired "tread pattern".

Tyre 1 also comprises a pair of so-called "sidewalls" 9, laterally applied to the carcass structure 2 on opposite sides and each comprising a radially internal portion 9*a* and a radially external portion 9*b*.

The carcass structure 2 may be optionally covered on its inner walls with a so-called "liner" 10 essentially consisting of at least one layer of air-tight elastomer material adapted to ensure the hermetic seal of the tyre when inflated.

Assembling of the above listed components, as well as production of one or more of same, takes place with the aid of a toroidal support 11, diagrammatically shown in FIGS. 2 to 6, shaped in accordance with the configuration of the inner walls of the tyre to be made.

In particular, such a toroidal support 11 has two axial expansions at a radially internal position thereof, which define frusto-conical rest surfaces 11*a* converging towards the rotation axis of the tyre away from an equatorial plane X-X of same, forming an angle just as an indication of 15° and preferably included between 10° and 20°, although values out of the above range are possible.

The toroidal support 11 may have reduced sizes as compared with those of the finished tyre, the linear value of the reduction being preferably included between 2% and 5% and being measured, just as an indication, along the circumferential extension of the toroidal support itself at its equatorial plane which is coincident with the equatorial plane X-X of the tyre.

The toroidal support 11, neither described nor shown in detail because it is not particularly important to the aims of the invention, may consist for example of a collapsible or dismountable drum, or of an inflatable bladder suitably strengthened to take and keep the desired toroidal conformation under inflated conditions.

All that being stated, manufacture of tyre 1 first involves formation of the carcass structure 2 beginning with possible formation of liner 10.

This liner 10 can be advantageously made by circumferentially winding up around the toroidal support 11, at least one ribbon-like band 12 of air-tight elastomer material, produced from an extruder and/or a calender located close to the toroidal support itself. As viewed from FIG. 1, winding of the ribbon-like band 12 substantially takes place with formation of circumferential coils disposed consecutively in side by side relationship so as to follow the cross-section profile of the outer surface of thee toroidal support 11.

For the purposes of the present description by cross-section profile it is intended the configuration exhibited by the half-section of the toroidal support 11 taken in a radial plane containing the geometric rotation axis of the toroidal support itself, not shown in the drawings, which is coincident with the geometric rotation axis of the tyre and, consequently, of the carcass structure 2 being manufactured.

In accordance with the present invention, the carcass ply or plies 3*a*, 3*b* are directly formed on the toroidal support 11 by deposition, as better clarified in the following, of strip-like sections that in the present description are identified as axially internal sections 13, axially external sections 14 and axially intermediate sections 15 respectively, depending on the position they have within the carcass structure 2.

The strip-like sections 13, 14, 15 are advantageously obtained from at least one continuous strip-like element preferably having a width included between 3 mm and 15 mm, essentially made up of longitudinally-disposed thread-like elements of textile or metallic material which are at least partly incorporated into one or more layers of elastomer material.

The continuous strip-like element may be advantageously produced from a calender or an extruder set up close to the toroidal support 11 on which tyre 1 is being formed, to be guided into a deposition apparatus lending itself to sequentially cut it so as to form the strip-like sections 13, 14, 15, concurrently with deposition of same on the toroidal support itself.

In more detail, the cutting operation of each strip-like section 13, 14, 15 is immediately followed by deposition of same on the toroidal support 11, the strip-like section taking a "U"-shaped configuration around the cross-section profile of the toroidal support itself. When deposition has taken place, in each strip-like section 13, 14, 15 it is possible to distinguish two side portions 13*a*, 14*a*, 15*a* radially extending, towards the axis of the toroidal support 11, at positions axially spaced apart from each other, and a crown portion 13*b*, 14*b*, 15*b* extending in a radially external position between the side portions. It is to be noted that the side portions 13*a*, 14*a*, 15*a* conform in shape to the surface of the toroidal support 11 until close to the axially external edges of the respective frusto-conical rest surfaces 11*a* so as to define, in the carcass plies 3*a*, 3*b*, respective axially internal, intermediate and external end flaps that continue in the respective end portions 13*c*, 14*c*, 15*c* axially bent outwardly, i.e. away from the equatorial plane X-X, each in a direction preferably parallel to the respective frusto-conical rest surface 11*a*.

Stickiness of the preferably raw elastomer material employed in making the continuous strip-like element and therefore the strip-like sections 13, 14, 15 ensures a steady adhesion of said sections to the toroidal support surfaces 11 also in the absence of liner 10 on the toroidal support itself.

Further details concerning the structural features and modalities for manufacturing and laying down the continuous strip-like element and the strip-like sections 13, 14, 15 are described in documents EP 928 680 and EP 928 702, in the name of the same Applicant, contents of which are considered as herein completely incorporated.

The toroidal support 11 can be driven in angular rotation following a stepping movement in synchronism with operation of said deposition apparatus, in such a manner that the cutting action of each strip-like section 13, 14, 15 is followed by deposition of same to a circumferentially next position, either spaced apart or contiguous, with respect to the previously laid down section 13, 14, 15.

In more detail, rotation of the toroidal support 11 takes place according to steps of angular movement each of which gives rise to a circumferential displacement that, depending on requirements, can substantially correspond to the width of each strip-like section 13, 14, 15, or substantially correspond to a multiple of this width. Consequently, the strip-like sections 13, 14, 15 will be laid down according to a circumferential distribution pitch substantially corresponding to their width or a multiple thereof. It should be understood that, for the purposes of the present description, when not stated otherwise, the term "circumferential" refers to a circumference lying in the equatorial plane X-X and close to the outer surface of the toroidal support 11.

In particular, in the embodiment depicted in FIGS. 1 to 7, the angular movement of the toroidal support 11 takes place in such a manner as to cause, by a first full revolution of the toroidal support around its own axis, deposition of the axially internal sections 13 circumferentially distributed according to a circumferential pitch equal to twice the width of each of them. Therefore, as clearly viewed from FIG. 2, between one of the axially internal sections 13 and the adjacent one an empty space or gap "S" is left that, at least at the crown portions 13*b* of the sections themselves, has a width substantially equal to that of said sections.

If required, deposition of the axially internal strip-like sections 13 may take place according to an orientation inclined to the circumferential extension direction of the toroidal support 11, by an angle included between 15° and 35° for example.

Adjustment of the deposition angle of the strip-like sections can be obtained for example by suitably orientating the geometric rotation axis of the toroidal support 11 relative to the deposition apparatus.

In addition, deposition of each axially internal-section 13 as well as the subsequent deposition of the axially external sections 14 and/or intermediate sections 15 may be provided to be carried out in deposition planes parallelly offset from a meridian plane of the toroidal support 11, as described in patent application WO 00/38906 in the name of the same Applicant, contents of which are considered as herein completely incorporated. By so doing, each side portion 13*a*, 14*a*, 15*a* of each strip-like section 13, 14, 15 will form, with respect to a plane radial to the geometric axis of the toroidal support 11 passing through the transition point between the side portion itself and the respective crown portion 13*b*, 14*b*, 15*b*, an angle of a different value than the angle formed by the crown portion itself relative to the same radial plane. In particular, in this way it will be possible to give a desired inclination to each side portion 13*a*, 14*a*, 15*a* with respect to a direction radial to the geometric axis of the toroidal support 11, while keeping the crown portion 13*b*, 14*b*, 15*b* in a plane radial to the geometric axis itself.

When deposition of the axially internal sections 13 over the whole circumferential extension of the toroidal support 11 has been completed, manufacture of the carcass structure 2 goes on with the step of applying at least one pair of elastic-support inserts 16 (only one of which is shown in the accompanying figures), each to an axially external position against the side portions 13*a* of the axially internal sections 13. In more detail, as visible from the accompanying figures, each elastic-support insert 16, preferably having a hardness included between 67 and 91 IRHD, has a cross-section profile substantially in the form of a lunette, gradually tapering towards a radially internal apex thereof 16*a*, disposed close to the respective annular anchoring structure 4, and towards a radially external apex thereof 16*b* located, just as an indication, in a shoulder region of the tyre, where transition between the side portions 13*a*, 14*a*, 15*a* and crown portions 13*b*, 14*b*, 15*b* of the strip-like sections 13, 14, 15 takes place.

Advantageously, each of the elastic-support inserts 16 can be formed directly against the side portions 13*a*, by winding up a continuous strip of elastomer material forced through an extruder operating close to the toroidal support 11, in the form of coils that are disposed axially close to and/or radially superposed on each other.

The continuous strip will have the final conformation in section of the elastic-support insert 16 already on coming out of the respective extruder. However, the continuous strip should preferably have a smaller section than that of the elastic-support insert 16, the latter being obtained by applying the strip itself in the form of several coils disposed in side by side and/or superposed relationship, so as to define the reinforcing insert itself in its final configuration. For further details concerning accomplishment of each elastic-support insert 16 please refer to the description of patent application PCT/IT99/00376 and/or of patent application WO 00/35666, both in the name of the same Applicant.

Concurrently with formation of the elastic-support inserts 16 the step of making at least part of said inextensible annular structures 4 arranged close to each of the inner end flaps of the carcass ply or plies 3*a*, 3*b* is accomplished, for the purpose of obtaining the carcass regions, known as "beads", specifically designed to ensure anchoring of tyre 1 to the corresponding mounting rim 1*a*. In accordance with the present invention at least one of the annular reinforcing structures 4, and preferably both of them, are advantageously made as taught in document WO 99/64225 in the name of the same Applicant.

In more detail, each annular reinforcing structure 4 preferably comprises at least one stiffening element 17 applied against at least one of the carcass plies 3*a*, 3*b* and having a cross-section profile extending away from the rotation axis of tyre 1, and at least one annular circumferentially-inextensible anchoring insert 18 having a cross-section profile of flattened conformation extending axially away from the stiffening element 17, starting from a radially internal edge thereof. In more detail, the cross-section profile of the annular anchoring insert 18, preferably applied in radial superposed relationship to the end portion 14*c* of the axially external sections 14, extends in a direction converging towards the geometric axis of the tyre, away from the equatorial plane X-X of the latter, according to an angle preferably of 15° and at all events corresponding to the inclination present on the corresponding frusto-conical rest surface 11*a*.

Also preferably provided, for at least one of the annular reinforcing structures 4 and preferably for both of them, is an auxiliary circumferentially inextensible stiffening element 19, disposed parallel to the stiffening element 17 and having a cross-section profile radially extending in an axially internal position with respect to the stiffening element itself, as well as an auxiliary annular anchoring insert 20 extending parallel to the anchoring insert 18, at a radially internal position relative thereto.

There is such a mutual interaction between the annular anchoring inserts 18, 20, the stiffening elements 17, 19 and the remaining components of the carcass structure 2 that the annular anchoring inserts and stiffening elements are substantially in engagement with each other in an integral manner and, from an operating point of view, behave like a monolithic structure substantially having an "L"-shaped conformation with a radial leg represented by the stiffening elements 17, 19 and an axial leg represented by the annular anchoring inserts 18, 20. Such an "L"-shaped monolithic structure has a geometric centre of gravity G placed at an axially external position relative to the stiffening elements

17, 19 and at an axially internal position relative to the axially external end edge and the annular anchoring, inserts 18, 20 so that the axially external end edge of the annular anchoring inserts 18, 20 will be pushed towards the rotation axis of the tyre, following a tension generated along the carcass ply or plies 3*a*, 3*b* by effect of the tyre inflation pressure, so as to ensure the tyre air-tightness. These features give the concerned tyre the functional behaviour and advantages widely described in the above mentioned document WO 99/64225 which is considered as herein completely incorporated.

All that being stated, in the embodiment shown in FIGS. 1 to 7 it is provided that, concurrently with application of the elastic-support inserts 16 the auxiliary circumferentially-inextensible stiffening elements 19 should be applied, close to each of the circumferential inner flaps of the first carcass ply 3*a* being manufactured.

Each auxiliary stiffening element 19, substantially in the form of a crown concentric with the geometric rotation axis of the toroidal support 11, has a cross-section profile radially extending away from the rotation axis of the tyre and preferably is located at an axially external position against the side portions 13*a* of the axially internal sections 13, at the above mentioned end portions 13*c*.

The auxiliary stiffening element 19 is preferably made up of at least one metal strip-like element wound up in several substantially concentric coils 19*a*. Coils 19*a* may be defined by a continuous spiral or by concentric loops formed by respective strip-like elements.

Combined with each auxiliary stiffening element 19 may be an auxiliary filling body (not shown in the drawings) of elastomer material of appropriate hardness, radially extending from the auxiliary stiffening element itself so as to join the radially internal apex of the respective elastic-support insert 16.

In accordance with a preferential embodiment, the auxiliary stiffening element 19 is directly made against the end flaps of the strip-like sections 13, formation of coils 19*a* being carried out by winding up of the thread-like element possibly with the aid of rollers or other convenient means acting against the toroidal support surface.

Due to stickiness of the elastomer layer coating the strip-like sections 13 and the possible presence of liner 10 previously laid down on the toroidal support itself, steady positioning of the individual coils 19*a* as they are formed is ensured.

After application of the auxiliary stiffening elements 19 being part of the annular anchoring structures 4, formation of the first carcass ply 3*a* is completed by deposition of the axially intermediate sections 15 applied on the toroidal support 11 in the same manner as described for the axially internal sections 13.

As clearly shown in FIG. 4, each intermediate section 15 is laid down so that its crown portion 15*b* is circumferentially interposed between the crown portions 13*b* of the axially internal sections 13, to fill the gap "S" existing therebetween. The side portions 15*a* of each intermediate section 15 are superposed, in an axially external position, on the elastic-support inserts 16 and the auxiliary stiffening elements 19, and the end portions 15*c* of the intermediate section itself are brought at least partly into radial superposition on the end portions 13*c* of the axially internal sections 13.

After carrying out deposition of the axially intermediate strip-like sections 15 as above described, to each of the opposite sides of the carcass structure 2 being made at least one auxiliary elastic-support insert 21 is applied, the cross-section profile of which is substantially in the form of a lunette tapering on opposite sides respectively towards a radially internal apex 21*a* located close to the respective annular anchoring structure 4 and a radially external apex 21*b* located in the tyre shoulder region. Each auxiliary insert 21, preferably made of elastomer material of a hardness included between 67 and 91 IRHD can be advantageously directly formed against the side portions 15*a* of the axially intermediate sections 15, in the same manner as described with reference to manufacture of the elastic-support inserts 16.

Before, after or concurrently with application of the auxiliary elastic-support inserts 21, application of the stiffening elements 17 and the auxiliary anchoring inserts 20 being part of the annular anchoring structures 4 as well, is carried out.

As viewed from the accompanying drawings, each of the stiffening elements 17 is preferably structured in the same manner as described with reference to the auxiliary stiffening elements 19.

In particular, each circumferentially-inextensible stiffening element 17 is formed from a respective strip-like element disposed in concentric coils 17*a* so as to form a crown disposed coaxial with the carcass structure 2 and having a cross-section profile radially extending against the end flaps of the first carcass ply 3*a*, close to the end portions 13*c*, 15*c* of the axially internal 13 and intermediate 15 sections.

In the same manner as described with reference to the auxiliary stiffening element 19, a filling body made of elastomer material and tapering away from the tyre rotation axis can be combined with the stiffening element 17 at a radially external position thereof.

Accomplishment and application of the stiffening element 17 can take place following any of the previously described modalities with reference to the auxiliary stiffening element 19.

The auxiliary circumferentially-inextensible annular anchoring insert 20 is made and applied against the end surfaces 13*c*, 15*c* of the axially internal and intermediate sections 13 and 15; it too is preferably obtained by winding up of at least one continuous thread-like element in concentric coils 20*a* disposed axially in side by side relationship around the toroidal support 11 to define a cross-section profile extending in a direction parallel to the respective frusto-conical rest surface 11*a*. Coils 20*a* forming the auxiliary annular anchoring insert 20 can be such disposed that one or more stretches thereof are radially superposed, possibly with the aid of rollers or other convenient means acting against the frusto-conical rest surfaces 11*a* of the toroidal support 11.

The auxiliary annular anchoring insert 20 can be advantageously manufactured in the extension of the stiffening element 17, before or after formation thereof, without creating any interruption in the thread-like element or elements employed in making both these two components.

Then formation of the second carcass ply 3*b* is started by deposition of the axially external strip-like sections 14.

This deposition step can be carried out in a manner identical or similar to the already described one with reference to deposition of the axially internal 13 and intermediate 15 sections.

In a convenient embodiment, the axially external strip-like sections 14 are laid down in a crossed orientation with respect to the internal and intermediate sections 13 and 15, preferably forming an angle symmetrically opposed to that formed by the latter with reference to the circumferential extension direction of the carcass structure 2.

Deposition of the axially external strip-like sections 14 preferably takes place according to a circumferential pitch substantially corresponding to their width, so as to cause completion of the second carcass ply formation 3*b* following a single full revolution carried out by the toroidal support 11 around its own rotation axis. When deposition has been completed, each of the auxiliary elastic-support inserts 21 is interposed between the side portions 15*a* of the axially intermediate sections 15 and the side portions 14*a* of the axially external sections 14.

In accordance with a preferential embodiment of the invention, after deposition of the axially external strip-like sections 14, formation of the annular anchoring structures 4 at the beads is completed.

To this aim, for each of the annular anchoring structures 4 application of the annular anchoring insert 18 against the respective end portions 14*c* axially bent outwardly of the axially external strip-like sections 14 is carried out. Accomplishment of the annular anchoring insert 18 too can be obtained in a manner identical or similar to that previously described with reference to the auxiliary annular anchoring insert 20, as well as to the stiffening elements 17, 19, i.e. by winding up at least one continuous strip-like element to form a plurality of coils 18*a* disposed axially close to each other in one or more superposed layers, to define a cross-section profile extending parallel to the respective frusto-conical rest surface 11*a*.

Following the above operation, each of the end portions 14*a* of the axially external sections 14 advantageously is enclosed and firmly retained between the annular anchoring element 28 and auxiliary annular anchoring insert 20.

In tyres of the radial type, usually applied to the carcass structure 2 is a belt structure 5.

Such a belt structure 5 can be made in any manner convenient for a person skilled in the art and, in the embodiment shown, it essentially comprises a first and a second belt strips 6*a*, 6*b* having cords with a respectively crossed orientation. Superposed on the belt strips 6*a*, 6*b* is an auxiliary belt strip 7, for instance obtained by arranging at least one continuous cord wound up in circumferential coils disposed in axial side by side relationship around the belt strips themselves.

Then a tread band 8 is applied to the belt structure 5, while application of sidewalls 9 to the side portions of the carcass structure 2 is carried out; these sidewalls too can be obtained in any manner convenient for a person skilled in the art.

Exemplary embodiments of a belt structure, sidewalls and a tread band that can be advantageously adopted for full manufacture of tyre 1 on the toroidal support 11 are described in document EP 919 406, in the name of the same Applicant.

Tyre 1 manufactured as above described now lends itself to be submitted, possibly after removal from support 11, to a vulcanization step that can be carried out in any known and conventional manner.

In FIGS. 8, 9 and 10 some other embodiments of tyres with a self-supporting carcass structure 2 to be obtained in accordance with the present invention are depicted.

Each of these embodiments substantially differs from the tyre described with reference to FIGS. 1 to 7 for the number of components provided in making the carcass structure 2 and the mutual arrangement of said components. Accomplishment of each component substantially takes place in a manner identical or similar to the one described with reference to FIGS. 1 to 7.

In particular, the tyre shown in FIG. 8 in its carcass structure 2 has a single carcass ply 3 formed of axially internal 13 and axially external 14 sections, in the absence of the intermediate sections 15 described with reference to FIGS. 1 to 7. Both axially internal and axially external sections, 13 and 14, are laid down according to a circumferential distribution pitch corresponding to a multiple of, more specifically twice, their width, where the crown portions 14*b* of the axially external sections 14 are each interposed between the crown portions 13*b* and two circumferentially-adjacent axially internal sections 13.

In the same manner as in the tyre manufacture in accordance with FIGS. 1 to 7, elastic-support inserts 16 are applied against the side portions 13*a* of the axially internal sections 13 before carrying out deposition of the axially external sections 14. Consequently, the elastic-support inserts 16 are interposed between the side portions 13*a*, 14*a* of the axially internal and axially external sections 13 and 14, once the carcass ply 3 manufacture has been completed.

Before deposition of the axially internal sections 13, auxiliary elastic-support inserts 21 are also provided to be arranged on the toroidal support 11, and for instance they can be directly formed against the opposite side surfaces of the latter or against liner 10 previously formed on said surfaces. Consequently, in the finished carcass structure 2 the auxiliary elastic-support inserts 21 are placed at an axially internal position relative to the side portions 14*a* of the axially external sections 14.

Unlike the embodiment shown in FIGS. 1 to 7, for each of the annular anchoring portions 4 the auxiliary stiffening element 19 is placed at an axially internal position against the side portions 13*a* of the axially internal sections 13. This auxiliary stiffening element 19 can be directly made on, or applied to, the toroidal support surfaces 11, before deposition of the axially internal sections 13.

The auxiliary annular anchoring insert 20 and stiffening element 17 are, in turn, interposed between the end portions 13*c*, 14*c* and side portions 13*a*, 14*a* belonging to the axially internal and external sections, 13 and 14, respectively.

In the embodiment shown in FIG. 9, the carcass structure 2 has a first carcass ply 3*a* and a second carcass ply 3*b*, formed from axially internal sections 13 and axially external sections 14 respectively, in the absence of the intermediate sections 15 described with reference to FIGS. 1 to 7.

In this case, both axially internal 13 and axially external 14 sections are laid down according to a circumferential distribution pitch substantially corresponding to their width. Before application of the axially internal sections 13, formation of a pair of auxiliary elastic-support inserts 21 is carried out, each of them being disposed against one of the opposite sides of the toroidal support 11. In the carcass structure 2 of the finished tyre, the auxiliary elastic support inserts 21 are therefore located at a position axially internal to the side portions 13*a* of the axially internal sections 13, in the same manner as described with reference to FIG. 8.

After deposition of the axially internal sections 13 and before deposition of the axially external sections 14, application of the elastic-support inserts 16 is carried out, said supports being interposed, in the finished tyre, between the side portions 13*a*, 14*a* of the inner 13 and outer 14 sections respectively.

Each annular anchoring structure 4 is made in the same manner as described with reference to the embodiment in FIG. 8, but, unlike the provision of the last mentioned embodiment, the auxiliary stiffening element 19 is made after application of the axially internal sections 13, at an axially external position against the side portions 13*a* of the latter, so as to match with the radially internal apex 16*a* of the respective elastic-support insert 16, in the same manner as described in FIGS. 1 to 7.

It is also preferably provided that a filling body 22 should be axially interposed between the stiffening element 17 and auxiliary stiffening element 19, as clearly viewed from FIG. 9. This filling body 22 can also have a prolongation thereof 22*a* radially extending outwardly of the stiffening element 17, to join the elastic-support insert 16 and be connected with the axially external side surface of the latter.

In the embodiment shown in FIG. 10 the carcass structure has a first and a second carcass plies 3*a*, 3*b*. The first carcass ply 3*a* is formed from axially internal sections 13 and first axially intermediate sections 15, laid down according to a circumferential pitch that is substantially twice their width, and sequentially alternated with each other, in the same manner as described with reference to manufacture of the first carcass ply 3*a* in the embodiment referred to in FIGS. 1 to 7.

Each elastic-support insert 16 is axially interposed between the side portions 13*a*, 15*a* belonging to the axially internal sections and the first axially intermediate sections, respectively. The second carcass ply 3*b* is in turn formed of axially intermediate sections 25 laid down on the first carcass ply 3*a* according to a circumferential distribution pitch substantially corresponding to twice their width, and of axially external sections 14 each alternated with, and interposed between, two of the second axially intermediate sections 25. The second intermediate sections 25 and the outer sections 14 forming the second carcass ply 3*b* can be laid down, if required, following a crossed orientation with respect to the first intermediate sections 15 and the inner sections 13 forming the first carcass ply 3*a*. Additionally or alternatively, the sections belonging to the first and second carcass plies 3*a*, 3*b* respectively are provided to be applied in deposition planes parallelly offset on respectively opposite sides from a meridian plane of the toroidal support 11, to give a crossed orientation to the side portions of said sections, while at the same time keeping the crown portions orientated in planes substantially radial to said geometric axis.

Interposed between the side portions 14*a*, 25*a* belonging to the outer sections 14 and second intermediate sections 25 respectively, at each of the tyre sidewalls 9, is at least one auxiliary elastic-support insert 21.

In each annular reinforcing structure 4, the end portions 14*c* of the axially internal sections 14 are applied at a radially external position to the auxiliary annular anchoring insert 20, in turn applied at a radially external position against the end portions 15*c*, 25*c* belonging to the first and second intermediate sections 15, 25 respectively, which mutually join close to the end flaps of the carcass plies 3*a*, 3*b*.

The stiffening element 17 is in turn axially interposed between the side portions 14*a* of the axially internal sections 14 and the side portions 15*a*, 25*a* of the first and second intermediate sections 15, 25. The auxiliary stiffening element 19 is axially interposed between the side portions 15*a*, 25*a* of the first and second intermediate sections 15, 25 and the side portions 13*a* belonging to the axially internal sections 13.

A first and a second fillers 23, 24 can be arranged respectively at a radially external position in the extension of the stiffening element 17 and the auxiliary stiffening element 19.

Irrespective of which embodiment is manufactured in accordance with the present invention, use of the elastic-support inserts 16, 21 incorporated into the carcass structure 2 at the sidewalls 9 enables tyres having beads of the "reverse flange" type to receive the desired self-support qualities, overcoming all problems and drawbacks found by the Applicant with reference to use of annular elements fitted on the rim, proposed by the known art. In particular, the absence of the annular element fitted on the rim as provided in documents U.S. Pat. Nos. 5,674,993 and 5,971,047, enables elimination of the risk that the tyre belt structure 5 may be brought directly into contact with rigid portions of the wheel as a result of shocks or impacts transmitted from the road surface to the ground-contacting region. Also greatly increased is the inner volume of the tyre to be filled with air or another inflating fluid, which is a further advantage for ride comfort, above all with reference to low-section tyres that, due to their nature, offer relatively limited inner volumes, the further reduction of which would therefore result in too high a penalty.

In addition, the present invention makes it surprisingly possible to obtain a tyre with beads adapted for reverse flanges and elastic-support inserts incorporated into the carcass structure 2 by a greatly simplified manufacturing process, from the point of view of the operating flexibility too, as compared with the solutions found in the known art.

It is also to be noted in this connection that, by conveniently selecting the deposition modalities for the inner 13, outer 14 and intermediate 15 and 25 strip-like sections the construction scheme and the consequent functional behaviour of the carcass structure 2 can be modified at will, thereby also obtaining carcass structures that are different from the above described embodiments.

In particular, it is for instance possible to lay down the inner sections 13 according to a circumferential distribution pitch substantially corresponding to their width, to obtain the first carcass ply 3*a* following a single full revolution of the toroidal support 11, and make a second carcass ply 3*b* using outer sections 14 laid down in an alternated sequence with the intermediate sections 15, after interposition of the elastic-support inserts 16.

In addition, in the carcass structure 2, the inner 13, intermediate 15 and/or 25 and outer 14 sections may be provided to cooperate in forming a single carcass ply. In this case, the sections belonging to each of the inner 13, intermediate 15 and/or 25 and outer series are laid down according to a circumferential distribution pitch which is a multiple of their width. In particular, the numerical factor that multiplied by the width of each section gives the measure of the circumferential distribution pitch will be equal to the number of the series of sections provided in forming the individual ply or each of the plies. For instance, if three series of sections, an inner 13, intermediate 15 and outer 14 series respectively, are provided, the circumferential distribution pitch of the sections of each series will correspond to three times their width.

In more detail, for the purpose of forming the carcass ply it is first provided that the axially internal sections 13 should be laid down according to a circumferential distribution pitch corresponding to a multiple of their width. After application of the elastic-support inserts 16 and possibly the auxiliary stiffening elements 19, the axially intermediate sections 15 are applied according to a circumferential distribution pitch corresponding to a multiple of their width, each with the respective crown portion 15*b* disposed circumferentially close to the crown portion 13*b* of one of the axially internal sections 13. Then, after application of the stiffening elements 17 and the possible auxiliary annular anchoring inserts 20, application of the axially external sections 14 is carried out, these sections too being laid down according to a circumferential pitch substantially corresponding to a multiple of their width. When deposition has been completed, each axially external section 14 has its crown portion 14*b* disposed in circumferential side by side relationship between the crown portion 13*b* of one of the axially internal sections 13 and the crown portion 15*b* of one of the axially intermediate sections 15, so as to define the carcass ply therewith. By so doing, the crown portions 13*b,* 15*b* and 14*b* of the individual sections, in the carcass ply thus made, are sequentially alternated in mutual side by side relationship along one and the same circumferential line, whereas the respective side portions 13*a,* 15*a,* 14*a* are axially offset from each other to house one or more elastic-support inserts 16, 21 in the gaps present between the side portions of the inner 13 and intermediate 15 sections, as well as between the side portions of the intermediate 15 and outer 14 sections.

In conclusion, by suitably selecting the deposition scheme of the strip-like sections, it is possible to control, depending on requirements, the containment effect exercised by the carcass ply or plies 3*a,* 3*b* around the elastic-support inserts 16, 21.

If necessary, in fact, the carcass plies 3*a,* 3*b* can be made and arranged so as to form a sort of container completely closed around at least one of the elastic support inserts 16, 21, for instance by respectively making the plies themselves with the axially internal 13 and axially external 14 sections laid down according to a pitch equal to their width and causing the end portions 13*c,* 14*c* of the sections to mutually match within the annular anchoring structures 4. Under this circumstance, the elastomer material of the support insert enclosed between plies 3*a,* 3*b* behaves like a sort of hydrostatic liquid, i.e. it is incompressible and its deformability is tightly related to the deformability of the container holding it.

If, on the contrary, at least one of the carcass plies 3*a,* 3*b* is made with two series of sections, the inner sections 13 and outer sections 14 for example, laid down in an alternated sequence and in subsequent steps after interposition of at least one elastic-support insert 16, it is originally possible to create a sort of container around the insert itself, which is partly open on its axially opposite sides. In this case, in fact, the support insert 16 will have the possibility of expanding in the gaps existing, on each of its axially opposite sides, between the side portions of the inner 13 and outer 14 sections laid down according to a pitch which is twice their width. Thus, the stiffening degree imparted as a whole to the carcass structure 2 is reduced, the modulus of elasticity of the elastomer material employed in making the support inserts 16 being the same. The amount of this reduction in the stiffening degree can be. advantageously modulated depending on requirements, by modifying the land/empty space ratio determined by the side portions of the strip-like sections on the axially opposite sides of the support insert 16 and/or 21, just as an indication between a maximum value and a minimum value, the former being obtained by manufacturing, as above said, two carcass plies 3*a,* 3*b* each formed of a single series of strip-like sections 13, 14 laid down according to a pitch equal to their width, and the latter being obtained by using, as in the example in FIG. 8, a single carcass ply 3*a* formed of two series of sections 13, 14 laid down in an alternated sequence.

It is also possible to modulate the degree of containment for the deformations of the elastic-support inserts 16, 21 by modifying, depending on requirements, the construction scheme of the annular anchoring structures 4, so as to modify the axial distance between the end portions 13*c,* 14*c,* 15*c* of the strip-like sections, in order to provide an additional possibility of expansion to the support inserts 16, 21 being deformed, in the direction of the tyre bead.

In conclusion, the invention, as compared with the known art, enables new variables to be introduced that have an influence on the tyre behaviour, particularly in connection with its stiffness both under inflated and under deflated conditions.

In particular, it becomes advantageously possible to conveniently modulate the containment degree obtained by the carcass ply or plies 3*a,* 3*b* around the elastic-support inserts 16, 21, so as to give the tyre 1 the desired self-support qualities without increasing the torsional stiffness of same too much, which is particularly important in terms of ride comfort, above all in connection with the effects produced by longitudinal impact forces that are transmitted to the wheel when the tyre encounters obstacles or unevennesses on the road surface.

The invention also enables manufacture of a self-supporting tyre the inventive carcass structure of which lends itself to be obtained directly on a toroidal support on which the whole tyre can be advantageously formed. In this way, all problems connected with manufacture, storage and management of semifinished products, which are common to the manufacturing processes of a traditional conception, are eliminated.

The invention claimed is:

1. A self-supporting tyre for vehicle wheels, comprising:

a carcass structure having at least one carcass ply provided with end flaps in engagement with respective annular reinforcing structures disposed in coaxial relationship with a rotation axis of the tyre at positions axially spaced apart from each other and each incorporated into a tyre bead, at least one of said beads exhibiting, at a radially internal position thereof, a rest surface that, in a diametrical section plane of the tyre, defines a profile converging towards the rotation axis of the tyre and away from an equatorial plane of the tyre;

a belt structure applied to the carcass structure at a radially external position thereof;

a tread band applied to the belt structure at a radially external position thereof;

at least one pair of sidewalls each extending between one of said beads and a side edge of the tread band, at a position axially external to the carcass structure;

at least one pair of elastic-support inserts incorporated into the carcass structure, each at one of said sidewalls;

wherein the elastic-support inserts have respective radially internal apices placed close to the beads, and radially external apices close to side edges of the tread band, wherein said at least one carcass ply comprises axially internal strip-like sections and axially external strip-like sections, wherein the axially internal and axially external strip-like sections are circumferentially distributed around said rotation axis and each extends in a "U"-shaped configuration around the cross-section profile of the carcass structure, to define: two side portions mutually spaced apart in an axial direction, and a crown portion extending at a radially external position between the side portions, wherein said elastic-support inserts are each axially interposed between side portions of the axially internal sections and side portions of the axially external sections.

2. A tyre as claimed in claim 1, further comprising:

axially intermediate strip-like sections circumferentially distributed around said rotation axis and each extending in a "U"-shaped configuration around the cross-section profile of the carcass structure to define two side portions overlapping, at an axially external position, wherein the elastic-support inserts comprise:

a crown portion extending in a radially external position between the side portions, and a pair of auxiliary elastic-support inserts each axially interposed between the side portions of the axially intermediate sections and the side portions of the axially external sections.

3. A tyre as claimed in claim 2, wherein:

the axially internal sections are distributed according to a circumferential pitch corresponding to a multiple of their width;

the axially intermediate sections are distributed according to a circumferential pitch corresponding to a multiple of their width and each have the respective crown portion interposed in circumferential approaching relationship between the crown portion of two axially internal sections, to define a first carcass ply therewith; and the axially external sections are distributed according to a circumferential pitch substantially corresponding to their width, to define a second carcass ply radially superposed on the first carcass ply close to said crown portions.

4. A tyre as claimed in claim 2, further comprising:

a second axially intermediate strip-like sections circumferentially distributed around said rotation axis and each extending in a "U"-shaped configuration around the cross-section profile of the carcass structure to define two side portions partly overlapping, at an axially external position, the side portions of the first axially intermediate sections; and a crown portion extending in a radially external position between the respective side portions.

5. A tyre as claimed in claim 2, wherein:

the axially internal sections are distributed according to a circumferential pitch substantially corresponding to a multiple of their width;

the first axially intermediate sections are distributed according to a circumferential pitch substantially corresponding to a multiple of a width of each of the first axially intermediate sections, with the respective crown portion interposed in circumferential approaching relationship between the crown portions of two axially internal sections, to define a first carcass ply therewith;

a second axially intermediate sections are distributed according to a circumferential pitch substantially corresponding to a multiple of a width of each of the first axially intermediate sections; and the axially external sections are distributed according to a circumferential pitch substantially corresponding to a multiple of a width of each of the first axially intermediate sections, with the respective crown portion interposed in circumferential approaching relationship between the crown portions of two of said second axially intermediate sections, to define a second carcass ply therewith, which second carcass ply is radially superposed on the first carcass ply close to said crown portions.

6. A tyre as claimed in claim 2, wherein:

the axially internal sections are distributed according to a circumferential pitch substantially corresponding to a width of each of the first axially intermediate sections, to define a first carcass ply;

the axially intermediate sections are distributed according to a circumferential pitch corresponding to a multiple of a width of each of the first axially intermediate sections; and the axially external sections are distributed according to a circumferential pitch corresponding to a multiple of a width of each of the first axially intermediate sections and each have the respective crown portion interposed in a circumferential approaching relationship between the crown portions of two axially intermediate sections, to define a second carcass ply therewith, said second carcass ply is radially superposed on the first carcass ply close to said crown portions.

7. A tyre as claimed in claim 2, wherein the axially internal, intermediate and external sections respectively, are distributed according to a circumferential distribution pitch which is a multiple of a width of each of the first axially intermediate sections, in accordance with a numerical factor corresponding to the number of series of inner, intermediate and outer sections provided in forming said at least one carcass ply.

8. A tyre as claimed in claim 7, wherein the crown portions of the individual inner, intermediate and outer sections are sequentially interposed in a mutual approaching relationship along a circumferential line, whereas the respective side portions are axially offset from each other to house at least one of said elastic-support inserts in empty spaces or gaps existing between the side portions of the inner and intermediate sections and between the side portions of the intermediate and outer sections.

9. A tyre as claimed in claim 2, wherein:

the axially internal sections are distributed according to a circumferential pitch substantially corresponding to a multiple of a width of each of the first axially intermediate sections;

the axially intermediate sections are distributed according to a circumferential pitch substantially corresponding to a multiple of a width of each of the first axially intermediate sections and each have the respective crown portion disposed circumferentially close to the crown portion of an axially internal section; and the axially external sections are distributed according to a circumferential pitch substantially corresponding to a multiple of a width of each of the first axially intermediate sections, each with its crown portion in circumferential approaching relationship between the crown portion of one of the axially internal sections and the crown portion of one of the axially intermediate sections, to define said at least one carcass ply therewith.

10. A tyre as claimed in claim 1, wherein the axially internal sections are distributed according to a circumferential pitch substantially corresponding to a multiple of a width of each of the first axially intermediate sections, the axially external sections each having the respective crown portion interposed in circumferential approaching relationship between the crown portions of two axially internal sections.

11. A tyre as claimed in claim 1, wherein the axially internal sections and axially external sections are distributed according to a circumferential pitch corresponding to the width of each section, to define a first carcass ply and a second carcass ply respectively, the second carcass ply being radially superposed on the first carcass ply close to said crown portions.

12. A tyre as claimed in claim 1, further comprising a pair of auxiliary elastic-support inserts each disposed at an axially internal position with respect to the axially internal sections.

13. A tyre as claimed in claim 1, wherein each of said strip-like sections substantially extends in a plane parallelly offset from a meridian plane of the tyre, so that the respective crown portion, with respect to a radial reference plane passing through the transition point between the crown portion itself and at least one of the corresponding side portions, is oriented so that the crown portion forms an angle of a value different from the inclination of the side portions.

14. A tyre as claimed in claim 13, wherein the axially internal sections and axially external sections lie in deposition planes that at respectively opposite sides are offset from said meridian plane, so that at least the side portions of the axially internal sections have a crossed orientation relative to the side portions of the axially external sections.

15. A tyre as claimed in claim 1, wherein at least one of said annular reinforcing structures comprises:

at least one stiffening element applied against said at least one carcass ply and having a cross-section profile extending away from the rotation axis of the tyre; and at least one annular circumferentially-inextensible anchoring insert having a cross-section profile of flattened conformation, extending axially away from the stiffening element in a direction converging towards the geometric rotation axis of the tyre, away from the equatorial plane thereof.

16. A tyre as claimed in claim 15, wherein the cross-section profile of the annular reinforcing structure has a geometric centre of gravity located at such a position that an axially external end edge of said annular anchoring insert is pushed towards the rotation axis of the tyre following a tension generated along said at least one carcass ply by effect of an inflation pressure of the tyre.

17. A tyre as claimed in claim 15, wherein the cross-section profile of the annular reinforcing structure has a geometric centre of gravity located at an axially external position with respect to said stiffening element and at an axially internal position with respect to an axially external end edge of said annular anchoring insert.

18. A tyre as claimed in claim 15, wherein said stiffening element is axially positioned between a respective axially internal end flap and a respective axially external end flap of said at least one carcass ply.

19. A tyre as claimed in claim 15, wherein said annular anchoring insert is applied against an end portion of an outer end flap of the carcass ply, said end portion extending axially away from the equatorial plane of the tyre.

20. A tyre as claimed in claim 19, wherein said annular anchoring insert is applied at a radially external position with respect to said end portion of the outer end flap.

21. A tyre as claimed in claim 15, wherein said annular anchoring insert is disposed substantially close to a radially internal edge of the stiffening element.

22. A tyre as claimed in claim 18, further comprising at least one auxiliary annular anchoring insert parallel to and radially close to said annular anchoring insert.

23. A tyre as claimed in claim 22, wherein said auxiliary anchoring insert is applied at a radially external position with respect to an end portion of said inner end flap, extending axially away from an equatorial plane of the tyre.

24. A tyre as claimed in claim 23, wherein said auxiliary anchoring insert is applied at a radially internal position relative to said end portion of the outer end flap.

25. A tyre as claimed in claim 15, further comprising at least one auxiliary circumferentially-inextensible stiffening element having a cross-section profile radially extending at an axially internal position relative to said stiffening element.

26. A method of manufacturing a self-supporting tyre for vehicle wheels, comprising the steps of:

preparing a carcass structure having at least one carcass ply provided with end flaps in engagement with respective annular reinforcing structures disposed in coaxial relationship with a rotation axis of the tyre at positions axially spaced apart from each other and each incorporated into a tyre bead, wherein the at least one of said beads exhibiting, at a radially internal position thereof, a rest surface that, in a diametrical section plane of the tyre, defines a profile converging towards the rotation axis of the tyre and away from an equatorial plane of the tyre;

wherein preparation of the carcass structure comprises:

arranging strip-like sections, each comprising longitudinal and parallel thread-like elements;

laying down axially internal strip-like sections circumferentially distributed on the toroidal support, each of said axially internal strip-like sections extending in a "U"-shaped configuration around the cross-section profile of the toroidal support, to define two side portions that are mutually spaced apart in an axial direction, and a crown portion extending in a radially external position between the side portions;

applying at least one pair of elastic-support inserts at an axially external position to the side portions of the axially internal sections, each at one of said sidewalls, wherein the elastic-support inserts have respective radially internal apices placed close to the beads, and radially external apices placed close to side edges of the tread band;

laying down axially external strip-like sections circumferentially distributed on the toroidal support, each of said axially external sections extending in a "U"-shaped configuration around the cross-section profile of the toroidal support, to define two side portions mutually spaced apart in an axial direction, each extending in an axially external position relative to one of the elastic-support inserts, and a crown portion extending in a radially external position between the side portions;

applying a belt structure to the carcass structure at a radially external position thereof;

applying a tread band to the belt structure at a radially external position thereof; and applying a pair of sidewalls to the carcass structure, at laterally opposite positions of the latter, each of said sidewalls extending between one of said beads and a side edge of the tread band.

27. A method as claimed in claim 26, wherein before deposition of the axially external sections the following further steps are carried out:

laying down axially intermediate strip-like sections circumferentially distributed around said rotation axis and each extending in a "U"-shaped configuration around the cross-section profile of the carcass structure to define two side portions overlapping, in an axially external position, said elastic-support inserts, and a crown portion extending in a radially external position between the side portions; and applying a pair of auxiliary elastic-support inserts, at an axially external position, to the side portions of the axially intermediate sections, before deposition of the axially external sections.

28. A method as claimed in claim 27, wherein:

the axially internal sections are laid down according to a circumferential distribution pitch substantially corresponding to a multiple of a width of each of the first axially intermediate sections;

the axially intermediate sections are laid down according to a circumferential distribution pitch substantially corresponding to a multiple of a width of each of the first axially intermediate sections, with the respective crown portion interposed in a circumferential approaching relationship between the crown portions of two axially internal sections, to define a first carcass ply therewith; and the axially external sections are laid down according to a circumferential distribution pitch substantially corresponding to a width of each of the first axially intermediate sections, to define a second carcass ply therewith, said carcass ply being radially superposed on the first carcass ply.

29. A method as claimed in claim 28, wherein before application of said auxiliary elastic support insert, and wherein the axially intermediate strip-like sections are first axially intermediate strip-like sections, the method comprising:

laying down second axially-intermediate strip-like sections circumferentially distributed around said rotation axis and each extending in a "U"-shaped configuration around the cross-section profile of carcass structure to define two side portions partly overlapping, at an axially external position, the side portions of the first axially intermediate sections being previously laid down, and a crown portion extending in a radially external position between the respective side portions.

30. A method as claimed in claim 29, wherein:

the axially internal sections are laid down according to a circumferential distribution pitch substantially corresponding to a multiple of a width of each of the first axially intermediate sections;

the first axially intermediate sections are laid down according to a circumferential distribution pitch substantially corresponding to a multiple of a width of each of the first axially intermediate sections, each having the respective crown portion interposed in a circumferential approaching relationship between the crown portions of two axially internal sections, to define a first carcass ply therewith;

the second axially intermediate sections are laid down according to a circumferential distribution pitch substantially corresponding to a multiple of a width of each of the first axially intermediate sections; and the axially external sections are laid down according to a circumferential distribution pitch substantially corresponding to a multiple of a width of each of the first axially intermediate sections, each having the respective crown portion interposed in a circumferential approaching relationship between the crown portions of two of said second axially intermediate sections, to define a second carcass ply therewith.

31. A method as claimed in claim 27, wherein:

the axially internal sections are laid down according to a circumferential distribution pitch substantially corresponding to a width of each of the first axially intermediate sections, to define a first carcass ply;

the axially intermediate sections are laid down according to a circumferential distribution pitch substantially corresponding to a multiple of a width of each of the first axially intermediate sections; and the axially external sections are laid down according to a circumferential distribution pitch substantially corresponding to a multiple of a width of each of the first axially intermediate sections, each having the respective crown portion interposed in a circumferential approaching relationship between the crown portions of two of said intermediate sections, to define a second carcass ply therewith, which carcass ply is radially superposed on the first carcass ply close to said crown portions.

32. A method as claimed in claim 27, wherein:

the axially internal sections are laid down according to a circumferential distribution pitch substantially corresponding to a multiple of a width of each of the first axially intermediate sections;

the axially intermediate sections are laid down according to a circumferential distribution pitch substantially corresponding to a multiple of a width of each of the first axially intermediate sections, each having the respective crown portion disposed circumferentially close to the crown portion of an axially internal section; and the axially external sections are laid down according to a circumferential pitch substantially corresponding to a multiple of a width of each of the first axially intermediate sections, each having its crown portion in circumferential approaching relationship between the crown portion of one of the axially internal sections and the crown portion of one of the axially intermediate sections, to define said at least one carcass ply therewith.

33. A method as claimed in claim 26, wherein the axially internal sections are distributed according to a circumferential pitch substantially corresponding to a multiple of a width of each of the first axially intermediate sections, the axially external sections being each laid down with the crown portion in circumferential approaching relationship between the crown portions of two axially internal sections.

34. A method as claimed in claim 26, wherein the axially internal sections are distributed according to a circumferential pitch substantially corresponding to a width of each of the first axially intermediate sections to define a first carcass ply, and the axially external sections are distributed according to a circumferential pitch substantially corresponding to a width of each of the first axially intermediate sections to define a second carcass ply radially superposed on the first carcass ply close to said crown portions.

35. A method as claimed in claim 26, further comprising the step of arranging a pair of auxiliary elastic-support inserts, each at an axially internal position with respect to the axially internal sections.

36. A method as claimed in claim 26, wherein each of said strip-like sections is laid down in a plane parallelly offset from a meridian plane of the toroidal support.

37. A method as claimed in claim 36, wherein the axially internal sections and axially external sections are respectively laid down in deposition planes that are offset at respectively opposite sides from said meridian plane, so that the side portions of the axially internal and axially external sections have respectively inclined orientations.

38. A method as claimed in claim 26, wherein accomplishment of at least one of said annular anchoring structures comprises the steps of:

applying at least one annular circumferentially-inextensible anchoring insert in radial superposed relationship with an end portion of at least one of said end flaps, said anchoring insert having a cross-section profile of flattened conformation extending axially away from the corresponding inner end flap and from an equatorial plane of the tyre; and applying at least one stiffening element against said at least one end flap, said stiffening element being substantially placed at an axially internal position relative to said annular anchoring insert and having a cross-section profile extending away from said rotation axis.

39. A method as claimed in claim 38, wherein application of said annular anchoring insert takes place by winding at least one thread-like element in concentric coils disposed axially close to each other around the toroidal support.

40. A method as claimed in claim 38, wherein application of said annular anchoring insert is carried out subsequently to deposition of the axially external sections.

41. A method as claimed in claim 38, wherein application of the stiffening element is carried out before application of the annular anchoring insert.

42. A method as claimed in claim 38, wherein application of said at least one stiffening element is carried out before deposition of the axially external sections.

43. A method as claimed in claim 38, wherein application of said at least one stiffening element is carried out by winding at least one thread-like element in concentric coils that are radially superposed around the toroidal support.

44. A method as claimed in claim 38, further comprising the step of applying an auxiliary circumferentially-inextensible annular anchoring insert disposed substantially parallel and radially close to said annular anchoring insert.

45. A method as claimed in claim 38, wherein an auxiliary anchoring insert is applied subsequently to deposition of the radially internal sections and before deposition of the radially external sections.

46. A method as claimed in claim 45, wherein application of said auxiliary anchoring insert takes place by winding up of at least one thread-like element in concentric coils disposed axially close to each other around the toroidal support.

47. A method as claimed in claim 38, wherein before applying said stiffening element, application of at least one auxiliary stiffening element radially extending in an axially internal position relative to the stiffening element is carried out.

48. A method as claimed in claim 47, wherein application of said auxiliary stiffening element preferably takes place by winding at least one thread-like element in concentric coils disposed radially close to each other around the toroidal support.

49. A method as claimed in claim 26, wherein each of said elastic-support inserts is formed by winding at least one continuous strip-like element of elastomer material so as to form coils that are disposed axially close to and/or radially superposed on each other around the geometric axis of the toroidal support.

* * * * *